US011337218B2

(12) United States Patent
Takano

(10) Patent No.: US 11,337,218 B2
(45) Date of Patent: May 17, 2022

(54) COMMUNICATION APPARATUS, COMMUNICATION METHOD, AND PROGRAM

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/769,588

(22) PCT Filed: Nov. 2, 2018

(86) PCT No.: PCT/JP2018/040819
§ 371 (c)(1),
(2) Date: Jun. 4, 2020

(87) PCT Pub. No.: WO2019/116773
PCT Pub. Date: Jun. 20, 2019

(65) Prior Publication Data
US 2021/0168786 A1 Jun. 3, 2021

(30) Foreign Application Priority Data
Dec. 14, 2017 (JP) .............................. JP2017-239548

(51) Int. Cl.
*H04W 72/04* (2009.01)
*H04W 16/28* (2009.01)
*H04W 72/00* (2009.01)

(52) U.S. Cl.
CPC ......... *H04W 72/046* (2013.01); *H04W 16/28* (2013.01); *H04W 72/005* (2013.01)

(58) Field of Classification Search
CPC ............ H04L 65/4076; H04L 65/4084; H04L 12/1836; H04L 12/18; H04L 12/185;
(Continued)

(56) References Cited

U.S. PATENT DOCUMENTS

2013/0125175 A1* 5/2013 Hao ................. H04N 21/47202
725/62
2014/0177504 A1 6/2014 Sayeed et al.
(Continued)

FOREIGN PATENT DOCUMENTS

JP 2009-245465 A 10/2009
JP 2010-045643 A 2/2010
(Continued)

OTHER PUBLICATIONS

International Search Report and Written Opinion dated Jan. 15, 2019 for PCT/JP2018/040819 filed on Nov. 2, 2018, 13 pages including English Translation of the International Search Report.

*Primary Examiner* — Margaret G Mastrodonato
(74) *Attorney, Agent, or Firm* — Xsensus LLP

(57) ABSTRACT

[Problem] The delivery of content to a terminal apparatus using a directional beam is achievable more suitably.
[Solution] There is provided a communication apparatus including a communication unit configured to perform wireless communication, and a control unit configured to control in such a way as to deliver content subjected to multicast from an upper node to a terminal apparatus using at least a part of a plurality of directional beams allocated to the terminal apparatus from the directional beams used for the wireless communication.

7 Claims, 23 Drawing Sheets

(58) Field of Classification Search
CPC ........... H04W 4/06; H04W 4/38; H04W 4/08; H04W 76/40; H04W 8/28
See application file for complete search history.

(56) References Cited

U.S. PATENT DOCUMENTS

| | | | |
|---|---|---|---|
| 2014/0286223 A1* | 9/2014 | Yu ........................ | H04L 12/185 370/312 |
| 2018/0242230 A1* | 8/2018 | Grinshpun .......... | H04L 65/1016 |

FOREIGN PATENT DOCUMENTS

| | | | |
|---|---|---|---|
| JP | 2015-159497 A | 9/2015 | |
| JP | 2017-157908 A | 9/2017 | |
| WO | 2010/059085 A1 | 5/2010 | |

* cited by examiner

M1(3GPP TS36.445)

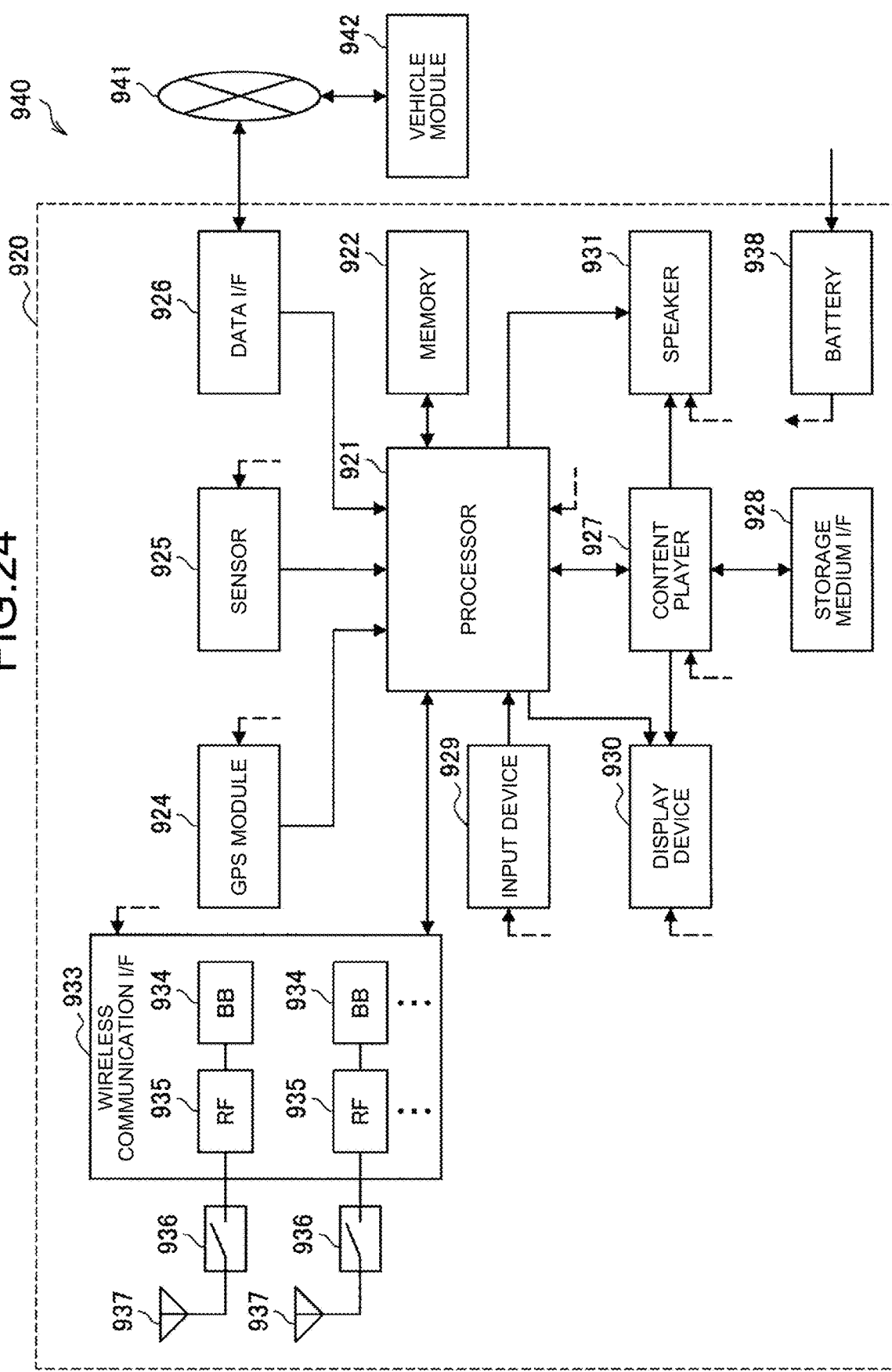

COMMUNICATION APPARATUS, COMMUNICATION METHOD, AND PROGRAM

CROSS-REFERENCE TO RELATED APPLICATIONS

The present application is based on PCT filing PCT/JP2018/040819, filed Nov. 2, 2018, which claims priority to JP 2017-239548, filed Dec. 14, 2017, the entire contents of each are incorporated herein by reference.

FIELD

The present disclosure relates to a communication apparatus, a communication method, and a program.

BACKGROUND

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), a terminal apparatus (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

In a fifth-generation (5G) mobile communication system following LTE/LTE-A, technology using a directional beam for communication between a base station and a terminal apparatus is being studied. The use of such technology allows communication between a base station and a terminal apparatus to achieve spatial multiplexing in addition to time and frequency multiplexing. In one example, Patent Document 1 discloses an example of a technique using a directional beam for communication between a base station and a terminal apparatus.

Further, as the technology for delivering content such as text, music, still images, and moving images to each terminal apparatus using the above-described wireless network, a technology called multimedia broadcast and multicast service (MBMS) is studied. The use of the MBMS technology makes it possible to efficiently deliver the above-mentioned various types of content that are broadcast as a program to a plurality of terminal apparatuses via the wireless network.

CITATION LIST

Patent Literature

Patent Literature 1: JP 2017-157908 A

SUMMARY

Technical Problem

On the other hand, in the fifth-generation (5G) mobile communication system, data is transmitted to each terminal apparatus while scanning a beam having directivity (also referred to hereinafter as a "directional beam"), and so the technique of delivering content to each terminal apparatus within the communication range is different from the communication using a non-directional beam. Thus, even in a situation where a directional beam is used for communication, the technology such as MBMS capable of efficiently delivering content provided as a so-called program (broadcasting program) to each terminal apparatus is desirable to be applicable more suitably.

Thus, the present disclosure provides technology enabling the delivery of content to a terminal apparatus using a directional beam to be achieved more suitably.

Solution to Problem

According to the present disclosure, a communication apparatus is provided that includes: a communication unit that performs wireless communication; and a control unit that controls in such a way as to deliver content subjected to multicast from an upper node to a terminal apparatus using at least a part of a plurality of directional beams allocated to the terminal apparatus from the directional beams used for the wireless communication.

Moreover, according to the present disclosure, a communication apparatus is provided that includes: a communication unit that performs wireless communication; and a control unit that controls in such a way to receive content subjected to multicast from an upper node to a base station and delivered from the base station using at least a part of directional beams allocated from a plurality of directional beams.

Moreover, according to the present disclosure, a communication method executed by a computer, the method is provided that includes: performing wireless communication; and controlling in such a way as to deliver content subjected to multicast from an upper node to a terminal apparatus using at least a part of a plurality of directional beams allocated to the terminal apparatus from the directional beams used for the wireless communication.

Moreover, according to the present disclosure, a communication method executed by a computer is provided that includes: performing wireless communication; and controlling in such a way to receive content subjected to multicast from an upper node to a base station and delivered from the base station using at least a part of directional beams allocated from a plurality of directional beams.

Moreover, according to the present disclosure, a program causing a computer to execute: performing wireless communication; and controlling in such a way as to deliver content subjected to multicast from an upper node to a terminal apparatus using at least a part of a plurality of directional beams allocated to the terminal apparatus from the directional beams used for the wireless communication.

Moreover, according to the present disclosure, a program is provided that causes a computer to execute: performing wireless communication; and controlling in such a way to receive content subjected to multicast from an upper node to a base station and delivered from the base station using at least a part of directional beams allocated from a plurality of directional beams.

Advantageous Effects of Invention

According to the present disclosure as described above, the technology is provided that enables the delivery of content to the terminal apparatus using the directional beam more suitably.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is a block diagram illustrating an example of a schematic configuration of a car navigation apparatus.

DESCRIPTION OF EMBODIMENTS

Figure 1:
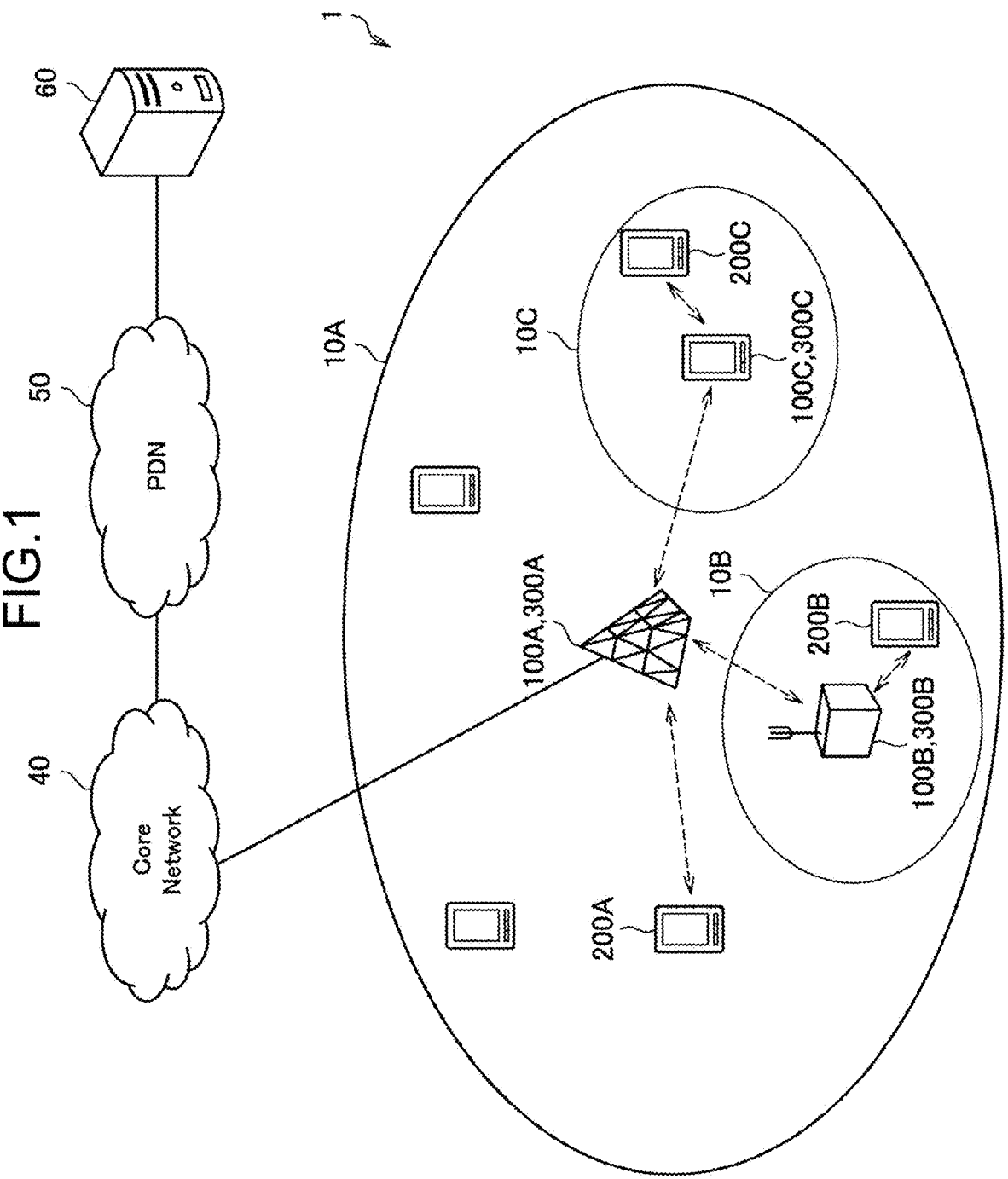
FIG. 1 is a diagram illustrated to describe an example of a schematic configuration of a system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Configuration example
1.1. Configuration example of system
1.2. Configuration example of base station
1.3. Configuration example of terminal apparatus
2. MBMS
3. Technical features
4. Application examples
4.1. Application examples for base station device
4.2. Application examples for terminal apparatus
5. Concluding remarks

1. CONFIGURATION EXAMPLE

1.1. Configuration Example of System

An example of a schematic configuration of a system 1 according to an embodiment of the present disclosure is now described with reference to FIG. 1. FIG. 1 is a diagram illustrated to describe an example of a schematic configuration of the system 1 according to an embodiment of the present disclosure. As illustrated in FIG. 1, the system 1 includes a wireless communication apparatus 100, a terminal apparatus 200, and an MEC server 300. The terminal apparatus 200 herein is also called a user. The user can also be called a UE. In other words, the above-described UE 200 can correspond to the terminal apparatus 200 illustrated in FIG. 1. The wireless communication apparatus 100C is also called UE-relay. The UE herein can be a UE defined in LTE or LTE-A, and the UE-relay can be the Prose-UE-to-Network relay, which is under development in 3GPP and can refer to more typically communication equipment.

(1) Wireless Communication Apparatus 100

The wireless communication apparatus 100 is an apparatus that provides a subordinate device with a wireless communication service. In one example, the wireless communication apparatus 100A is a base station of a cellular system (or a mobile communication system). The base station 100A establishes wireless communication with a device located within a cell 10A (e.g., the terminal apparatus 200A) of the base station 100A. In one example, the base station 100A transmits a downlink signal to the terminal apparatus 200A and receives an uplink signal from the terminal apparatus 200A.

The base station 100A establishes a logical connection with other base stations over, in one example, the X2 interface, and is capable of transmitting and receiving control information or the like. In addition, the base station 100A establishes a logical connection with a core network 40 over, in one example, the S1 interface, and is capable of transmitting and receiving control information or the like. Moreover, communication between these apparatuses can be relayed through various devices physically.

In this description, the wireless communication apparatus 100A illustrated in FIG. 1 is a macrocell base station, and the cell 10 is a macrocell. On the other hand, the wireless communication apparatuses 100B and 100C are master devices that operate the small cells 10B and 10C, respectively. As an example, the master device 100B is a fixedly installed small cell base station. The small cell base station 100B establishes a wireless backhaul link with the macrocell base station 100A and establishes an access link with one or more terminal apparatuses (e.g., the terminal apparatus 200B) within the small cell 10B. Moreover, the wireless communication apparatus 100B can be a relay node defined by 3GPP. The master device 100C is a dynamic access point (AP). The dynamic AP 100C is a mobile device that dynamically operates the small cell 10C. The dynamic AP 100C establishes a wireless backhaul link with the macrocell base station 100A and establishes an access link with one or more terminal apparatuses (e.g., the terminal apparatus 200C) within the small cell 10C. The dynamic AP 100C can be, in one example, a terminal apparatus equipped with hardware or software operable as a base station or a wireless access point. In this case, the small cell 10C is a dynamically configured localized network (virtual cell).

The cell 10 can be operated, in one example, in accordance with any wireless communication scheme such as LTE, LTE-Advanced (LTE-A), GSM (registered trademark), UMTS, W-CDMA, CDMA200, WiMAX, WiMAX2, IEEE802.16, and the like.

Moreover, the small cell is a concept that can include various types of cells (e.g., such as femtocells, nanocells, picocells, and microcells) that are smaller than the macrocell and are arranged to overlap or not to overlap with the macrocell. In one example, a small cell is operated by a dedicated base station. In another example, a small cell is operated by a terminal acting as a master device that temporarily operates as a small cell base station. It is also possible for a so-called relay node to be considered as a form of small cell base station. A wireless communication apparatus functioning as a master station of a relay node is also called a donor base station. The donor base station can mean a DeNB in LTE, and can more generally refer to a master station of a relay node.

(2) Terminal Apparatus 200

The terminal apparatus 200 is capable of performing communication in a cellular system (or a mobile communication system). The terminal apparatus 200 performs wireless communication with a wireless communication apparatus of the cellular system (e.g., the base station 100A and the master device 100B or 100C). In one example, the terminal apparatus 200A receives a downlink signal from the base station 100A and transmits an uplink signal to the base station 100A.

(3) Application Server 60

An application server 60 is a device that provides a user with a service. The application server 60 is connected to a packet data network (PDN) 50. On the other hand, the base station 100 is connected to the core network 40. The core network 40 is connected to the PDN 50 via a gateway device (P-GW in FIG. 8). Thus, the wireless communication apparatus 100 provides the MEC server 300 and the user with the service provided by the application server 60, via the packet data network 50, the core network 40, and the wireless communication channel.

(4) MEC Server 300

The MEC server 300 is a service-providing device that provides a user with a service (such as application and content). The MEC server 300 can be provided in the wireless communication apparatus 100. In this case, the wireless communication apparatus 100 provides the user with the service provided by the MEC server 300 via the wireless communication channel. The MEC server 300 can be implemented as a logical functional entity or can be configured integrally with the wireless communication apparatus 100 or the like as illustrated in FIG. 1.

In one example, the base station 100A provides the terminal apparatus 200A connected to the macrocell 10 with the service provided by the MEC server 300A. In addition, the base station 100A provides the terminal apparatus 200B connected to the small cell 10B, via the master device 100B, with the service provided by the MEC server 300A.

Further, the master device 100B provides the terminal apparatus 200B connected to the small cell 10B with the service provided by the MEC server 300B. Similarly, the master device 100C provides the terminal apparatus 200C connected to the small cell 10C with the service provided by the MEC server 300C.

(5) Supplement

Although the schematic configuration of the system 1 is described above, the present technology is not limited to the example illustrated in FIG. 1. Examples of the configuration of the system 1 can employ a configuration with no master device, a configuration of a small cell enhancement (SCE), a configuration of a heterogeneous network (HetNet), a configuration of a machine-type communication (MTC) network, or the like.

1.2. Configuration Example of Base Station

Figure 2:
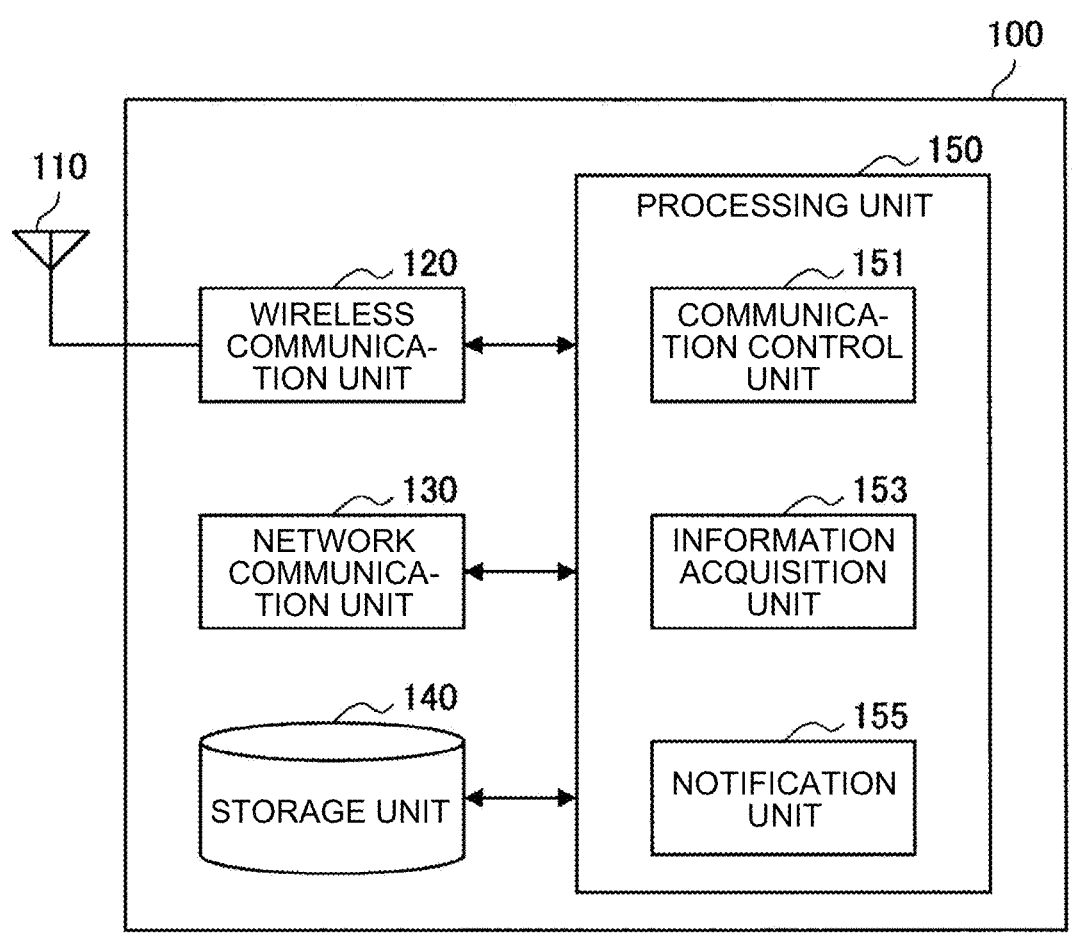
FIG. 2 is a block diagram illustrating an example of a configuration of a base station according to the present embodiment.

A configuration of the base station 100 according to an embodiment of the present disclosure is now described with reference to FIG. 2. FIG. 2 is a block diagram illustrating an example of a configuration of the base station 100 according to an embodiment of the present disclosure. Referring to FIG. 2, the base station 100 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120 into space as a radio wave. In addition, the antenna unit 110 converts a radio wave in space into a signal and outputs the signal to the wireless communication unit 120.

(2) Wireless Communication Unit 120

The wireless communication unit 120 transmits and receives a signal. In one example, the wireless communication unit 120 transmits a downlink signal to a terminal apparatus and receives an uplink signal from a terminal apparatus.

(3) Network Communication Unit 130

The network communication unit 130 transmits and receives information. In one example, the network communication unit 130 transmits and receives information to and from other nodes. In one example, the above-mentioned other nodes include other base stations and core network nodes.

Moreover, as described above, in the system 1 according to the present embodiment, the terminal apparatus operates as a relay terminal to relay communication between a remote terminal and a base station in some cases. In such a case, in one example, the wireless communication apparatus 100C corresponding to the relay terminal is not necessarily provided with the network communication unit 130.

(4) Storage Unit 140

The storage unit 140 temporarily or permanently stores various data and a program necessary for operating the base station 100.

(5) Processing Unit 150

The processing unit 150 allows the base station 100 to perform various functions. The processing unit 150 includes a communication control unit 151, an information acquisition unit 153, and a notification unit 155. Moreover, the processing unit 150 can further include other components than these components. In other words, the processing unit 150 can perform other operations than the operations of these components.

The operations of the communication control unit 151, the information acquisition unit 153, and the notification unit 155 will be described later in detail.

1.3. Configuration Example of Terminal Apparatus

Figure 3:
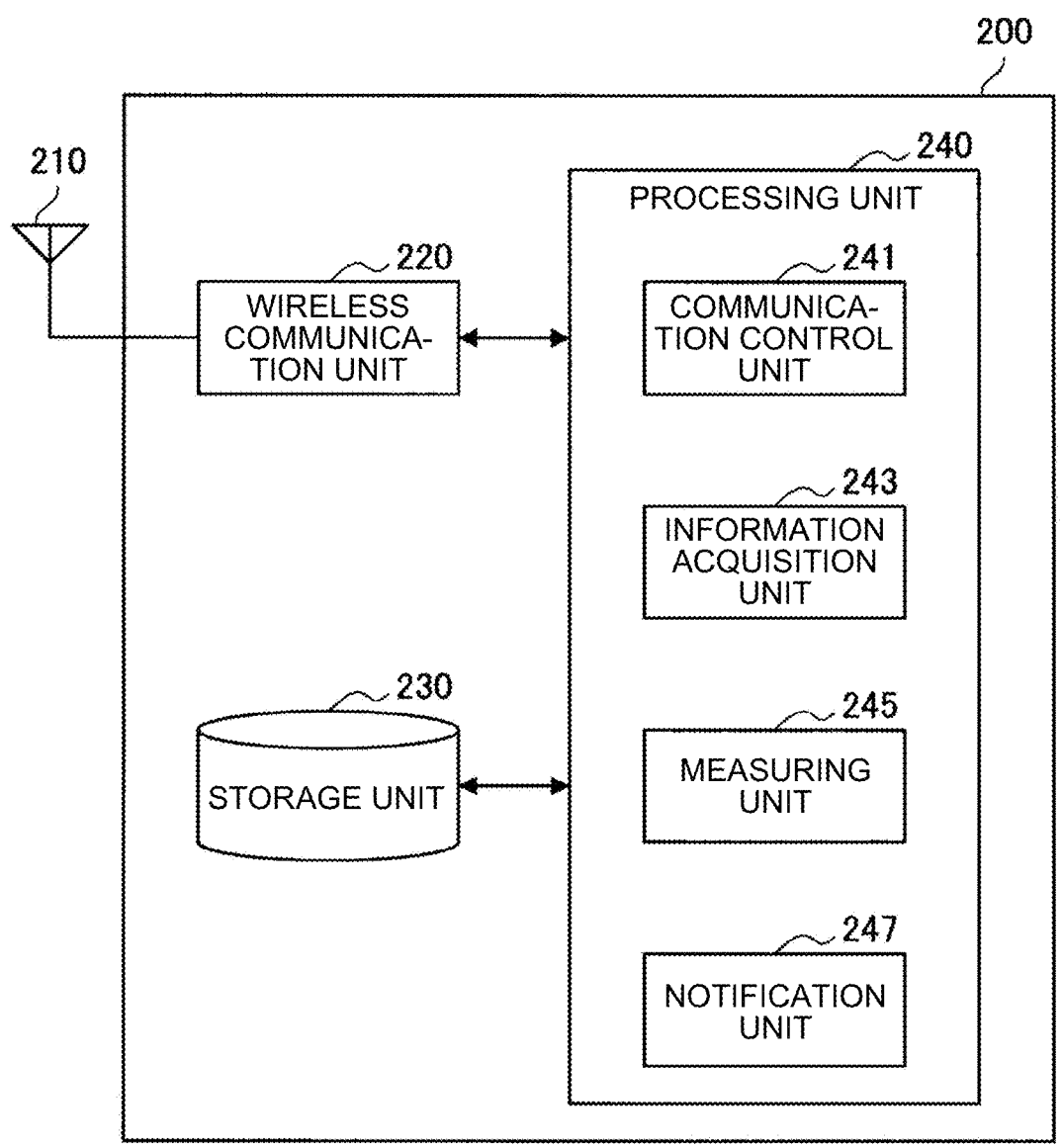
FIG. 3 is a block diagram illustrating an example of a configuration of a terminal apparatus according to the present embodiment.

An example of a configuration of the terminal apparatus 200 according to an embodiment of the present disclosure is now described with reference to FIG. 3. FIG. 3 is a block diagram illustrating an example of a configuration of the terminal apparatus 200 according to an embodiment of the present disclosure. As illustrated in FIG. 3, the terminal apparatus 200 includes an antenna unit 210, a wireless communication unit 220, a storage unit 230, and a processing unit 240.

(1) Antenna Unit 210

The antenna unit 210 radiates a signal output by the wireless communication unit 220 into space as a radio wave. In addition, the antenna unit 210 converts a radio wave in space into a signal and outputs the signal to the wireless communication unit 220.

(2) Wireless Communication Unit 220

The wireless communication unit 220 transmits and receives a signal. In one example, the wireless communication unit 220 receives a downlink signal from a base station and transmits an uplink signal to a base station.

Further, as described above, in the system 1 according to the present embodiment, the terminal apparatus can operate as a relay terminal to relay communication between a remote terminal and the base station in some cases. In such a case, in one example, the wireless communication unit 220 in the terminal apparatus 200C operating as a remote terminal can transmit and receive a side-link signal to and from the relay terminal.

(3) Storage Unit 230

The storage unit 230 temporarily or permanently stores various data and a program necessary for operating the terminal apparatus 200.

(4) Processing Unit 240

The processing unit 240 allows the terminal apparatus 200 to perform various functions. For example, the processing unit 240 includes a communication control unit 241, an information acquisition unit 243, a measuring unit 245, and a notification unit 247. Moreover, the processing unit 240 can further include other components than these components. In other words, the processing unit 240 can perform other operations than the operations of these components.

The operations of the communication control unit 241, the information acquisition unit 243, the measuring unit 245, and the notification unit 247 will be described later in detail.

2. MBMS

A description of MBMS is now given. The MBMS is a technique for delivering content such as text, music, still images, and moving images to each terminal apparatus using a wireless network and is officially referred to as "multimedia broadcast multicast services". Moreover, a description of an overview of broadcast and multicast is given below to make the characteristics of the communication system according to an embodiment of the present disclosure easier to understand.

The broadcast is a unidirectional point-to-multipoint downlink transmission. The broadcast is unnecessary to communicate with a network in providing the service, even in a power-saving state not connected to the network, such as a so-called "RRC idle" state, the terminal apparatus is capable of receiving the delivery of a broadcast service. In other words, the terminal apparatus is capable of, even in the RRC idle state, receiving content that is broadcast from the base station and presenting the content to the user.

The multicast is similar to the broadcast in that it provides a plurality of terminal apparatuses with a service. However, the multicast differs from the broadcast in that the terminal apparatus, upon receiving a service, is necessary to indicate to the network that the terminal apparatus attempts to receive the service. In other words, in the multicast, the terminal apparatus necessitates communication with the network to receive a service.

Moreover, in 5G, a high frequency of 6 GHz or more is usable, but a high-frequency band has higher propagation loss. Thus, to compensate for propagation loss, a higher antenna gain is obtained by giving directivity to radio waves (wireless signals) by beam forming. For this reason, the directivity is directed to a particular terminal apparatus by beam forming, so it is desirable to indicate that the terminal apparatus desires to receive the service corresponding to MBMS. In other words, in applying MBMS to the 5G mobile communication system, it is more important to implement the delivery of content by multicast. Moreover, in the following description, the service corresponding to MBMS is also referred to as "MBMS service".

(MBMS Network Architecture)

Figure 4:
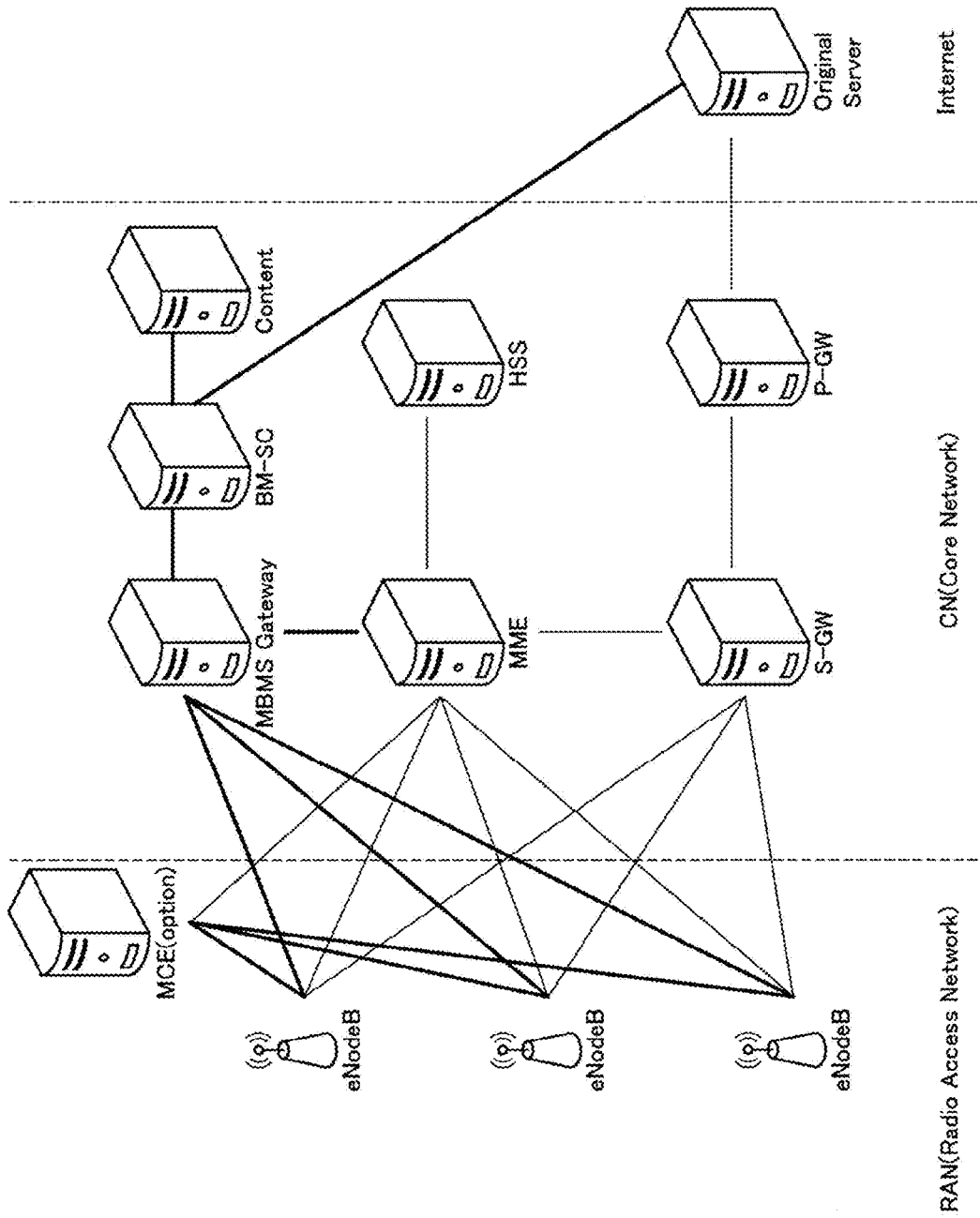
FIG. 4 is a diagram illustrated to describe an overview of MBMS network architecture.

An overview of the MBMS network architecture is now described with reference to FIG. 4. FIG. 4 is a diagram illustrated to describe an overview of the MBMS network architecture.

As illustrated in FIG. 4, the MBMS network architecture includes a core network (CN) and a radio access network (RAN). In addition, the CN includes various entities. Examples of the entities included in the CN include mobility management entity (MME), home subscriber server (HSS), serving gateway (S-GW), packet data network gateway (P-GW), MBMS gateway, broadcast multicast service center (BM-SC), content server, and the like. In addition, in the MBMS network architecture, an example on the side of the RAN includes multi-cell/multicast coordination entity (MCE). Moreover, among these entities, MCE, MBMS gateway, BM-SC, and content server are entities specific to MBMS, and the other entities are similar to the entities used for unicast communication in LTE. In addition, the content to be provided in the MBMS service can be provided from inside the operator's network or can be provided from the Internet network. Moreover, an entity in the CN (particularly, an MBMS gateway or a BM-SC) corresponds to an example of an "upper node" of the base station. In addition, the MME corresponds to an example of a "predetermined node that manages a session".

An overview of each of the entities specific to the MBMS, that is, the MCE, the MBMS gateway, the BM-SC, and the content server is now described.

(MCE)

A description of MCE is first given. As illustrated in FIG. 4, the MCE is classified as an entity on the side of the RAN. The MCE can be located in each base station (eNodeB) or can be located outside the base station. Examples of the role of the MCE include three functions of "allocation of time and frequency resources for MBMS", "decision of modulation and coding scheme (MCS)", and "counting function". Moreover, the MCS corresponds to a modulation scheme or coding rate. In addition, the counting function corresponds to a function of collecting how much the user is interested in the service. The counting function makes it possible, in one example, for the base station to allocate time and frequency resources for MBMS or stop the allocation depending on the number of interested users (i.e., the number of terminal apparatuses desiring to deliver content).

Moreover, in LTE, an omnidirectional beam is used, so it is difficult to control the MCS individually for each terminal apparatus. On the other hand, in 5G, it is possible to allocate a beam individually to each terminal apparatus, so in one example, it is also possible to provide content (e.g., content corresponding to MBMS) using different MCSs for each terminal apparatus.

In other words, in 5G, in one example, a situation can be assumed in which an MBMS service is provided to each terminal apparatus using a UE-specific beam. Even in a case where the handling between the base station and the terminal apparatus is used like unicast (strictly speaking, it is multicast because similar content is delivered to a plurality of terminal apparatuses), the content is delivered using multicast (multicast for the IP layer) between the content server and the base station. Thus, a function called counting is important to specify which base station to perform multicasting.

Figure 5:
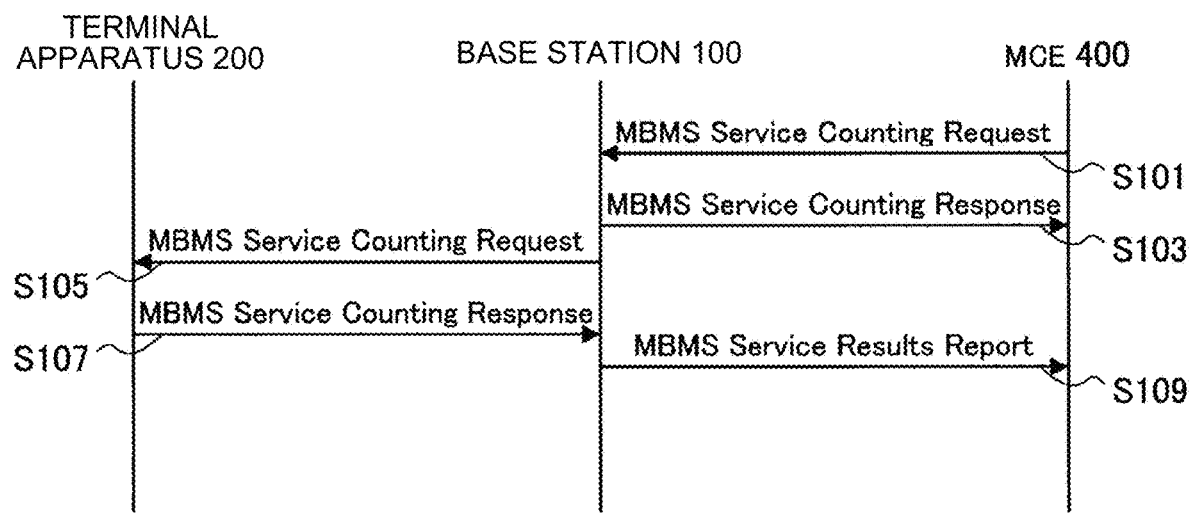
FIG. 5 is a diagram illustrated to describe an example of a procedure for performing "counting".

For reference, an example of the existing procedure for performing the counting is now described with reference to FIG. 5. FIG. 5 is a diagram illustrated to describe an example of a procedure for performing counting.

As illustrated in FIG. 5, at first, an MCE 400 transmits an MBMS service counting request to the base station 100 (S101). The base station 100 receives the MBMS service counting request from the MCE 400 and replies an MBMS service counting response to the MCE 400 (S103). Then, the base station 100 transmits an MBMS service counting request to the terminal apparatus 200 (S105). The terminal apparatus 200 receives the MBMS service counting request from the base station 100 and replies an MBMS service counting response to the base station 100 (S107). Then, the base station 100, when receiving the MBMS service counting response from the terminal apparatus 200, transmits an MBMS service results report to the MCE 400 (S109). The procedure as described above makes it possible for the MCE 400 to recognize the number of terminal apparatuses that desire to provide the MBMS service, in one example, on the basis of the report (the MBMS service results report) transmitted from the base station 100.

(MBMS Gateway)

Subsequently, a description of the MBMS gateway is given. As illustrated in FIG. 4, the MBMS gateway is an entity located in the CN. The MBMS gateway has a function of sending a packet to a corresponding base station (eNodeB) using Internet protocol (IP) multicast address as a key. In LTE, MBMS is assumed only to use broadcast and does not support multicast. This means that the service does not support multicast. On the other hand, multicast is used for the IP layer. Specifically, in order for the service to be broadcast to a plurality of terminal apparatuses, the previous signaling between the plurality of base stations and the MBMS gateway allows at least some of the base stations to be specified and to be transferred only to the specified base station. Thus, a multicast address is used in the IP layer.

Figure 6:
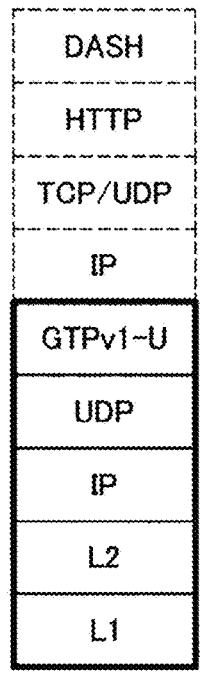
FIG. 6 is a diagram illustrating an example of a protocol stack of an M1 interface between an MBMS gateway and a base station.

In one example, FIG. 6 is a diagram illustrating an example of a protocol stack of the M1 interface between the MBMS gateway and the base station. Among the protocols illustrated in FIG. 6, the layers of DASH, HTTP, TPC/UDP, and IP located on the upper side are not explicitly described in the standard, but it is presumed that the configuration illustrated in FIG. 6 will be obtained in a case similar to the ordinary unicast. In addition, the layers of GTPv1-U, UDP, IP, L2, and L1 located on the lower side are similar to the S1 interface in the unicast. Moreover, the IP layer used to transfer a packet to a plurality of base stations on the basis of the multicast address is an IP layer located on the lower side.

In LTE, as described above, a packet is multicast from the MBMS gateway to a plurality of base stations, and the plurality of base stations transmit packets received in synchronization with each other to a terminal apparatus through wireless communication. On the other hand, in 5G, an MBMS service is provided to each terminal apparatus using a UE-specific beam. Thus, a cache function is provided for the base station, and the terminal apparatus is capable of optionally selecting the time for receiving the MBMS service within a certain fixed period.

In 5G MBMS, caching of the content corresponding to MBMS (hereinafter also referred to as "MBMS content") in a base station makes it possible to provide a terminal apparatus with a service more flexibly, resulting in expecting an effect of further reducing the CN traffic. In addition, it is possible to further reduce resource consumption by MBMS on the side of RAN, by transmitting content for each terminal apparatus using the UE-specific beam instead of transmitting content by the existing broadcast or multicast on the side of RAN.

(BM-SC)

Subsequently, a description of BM-SC is given. The BM-SC corresponds to the entry point of MBMS content. The BM-SC has the functions as described below. As the first function, the BM-SC performs MBMS session management. Specifically, the BM-SC manages the start and end of the MBMS service. As the second function, the BM-SC allocates an ID called a temporary mobile group identity (TMGI) to each MBMS session. As the third function, the BM-SC allocates QoS to an MBMS session. As the fourth function, the BM-SC provides the terminal apparatus with information regarding broadcasting such as a program guide at the application level (TS29.061).

In LTE, the MBMS traffic and the unicast traffic are separated into sub frames. Specifically, a radio frame having a length of 1 ms is divided into ten sub frames having a length of 0.1 ms, and an MBMS service is provided in some of the sub frames. Thus, MBMS and unicast are separate networks, and even if the unicast traffic increases, the situation where the MBMS traffic is affected is extremely limited, in one example, as in the case or the like where the sub frames allocated to MBMS are semi-statically changed. In a case where the MBMS service is provided by unicast using a UE-specific beam, it can be assumed that there is a possibility that at least one of the ordinary unicast or the unicast of the MBMS service affects the other.

(Content Server)

Subsequently, a description of the content server is given. The content server is a server that provides content. The content server can be located both inside and outside the operator's network.

(Session Start Procedure)

Subsequently, an example of an MBMS session start procedure in LTE is described for reference to make the characteristics of the communication system according to the present embodiment more understandable. In one example, FIG. 7 is a sequence diagram illustrating an example of the MBMS session start procedure in LTE.

Figure 7:
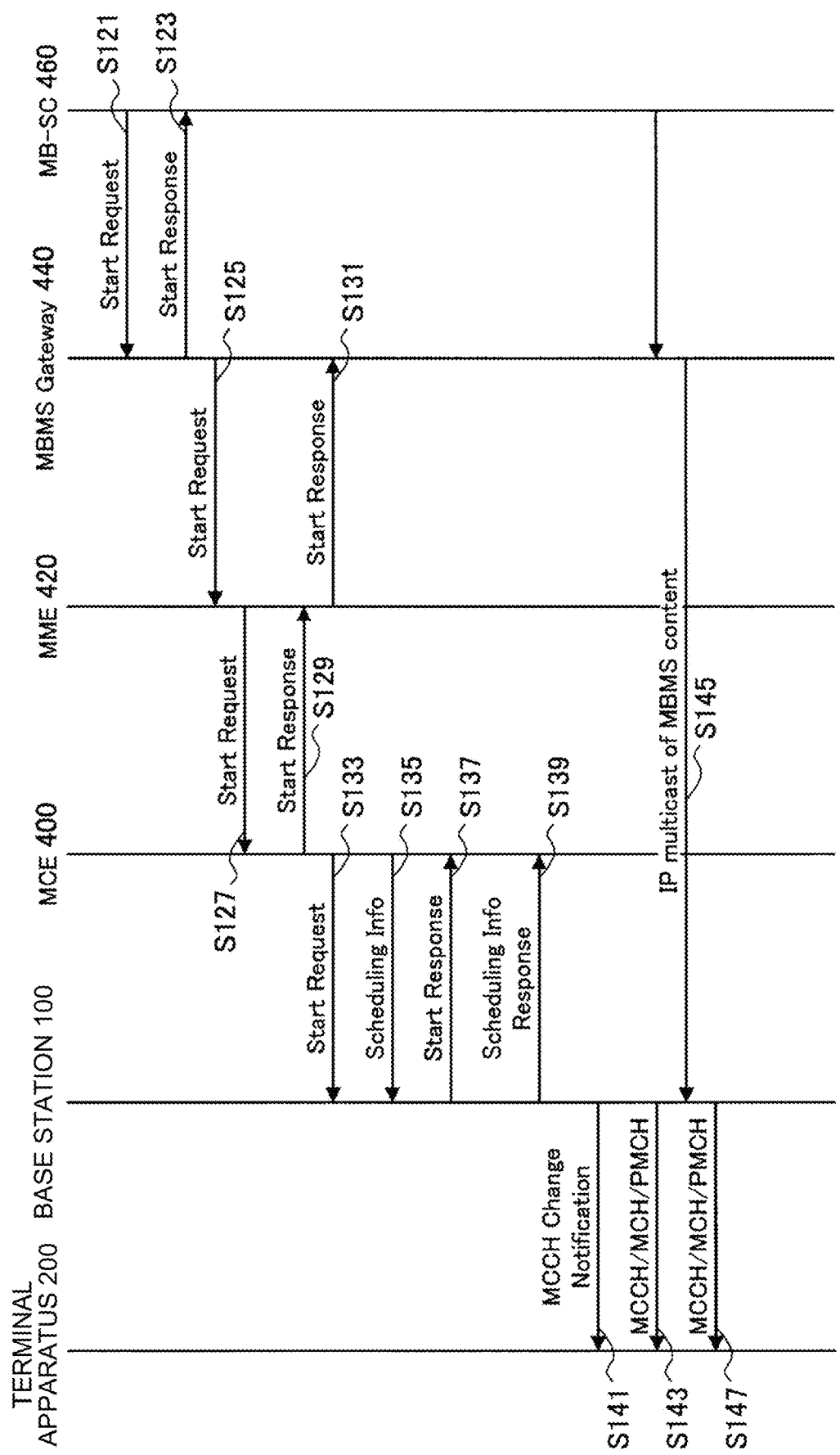
FIG. 7 is a sequence diagram illustrating an example of an MBMS session start procedure in LTE.

As illustrated in FIG. 7, the MBMS session start procedure starts from an MB-SC. Specifically, at first, an MB-SC 460 transmits a request to start (Start Request) an MBMS session to an MBMS gateway 440 (S121). In this case, in one example, information such as a service area, QoS, and a mobile group identity (MGI) is notified through the request. The MBMS gateway 440 replies a response to the request (Start Response) from the MB-SC 460 (S123).

Subsequently, the MBMS gateway 440 transmits a request to start (Start Request) the MBMS session to the MME 420 (S125). The MME 420, when receiving the request from the MBMS gateway 440, transmits a request to start (Start Request) an MBMS session to the MCE 400 (S127). The MCE 400, when receiving the request from the MME 420, replies a response (Start Response) to the MME 420 (S129). The MME 420, when receiving the response from the MCE 400, replies, to the MBMS gateway 440, a response (Start Response) to the request from the MBMS gateway 440 (S131).

Subsequently, the MCE 400 transmits a request to start (Start Request) the MBMS session to the base station 100 that is the service area (S133). In addition, the MCE 400 notifies the base station 100 of information regarding the schedule of the MBMS session (Scheduling Info) (S135). The base station 100 replies, to the MCE 400, a response (Start Response) to the request from the MCE 400 (S137). In addition, the base station 100, when receiving the notification of the information regarding the schedule of the MBMS session from the MCE 400, replies a response (Scheduling Info Response) to the MCE 400 (S139).

Subsequently, the base station 100, on the basis of the information notified from the MCE 400, transmits an MCCH change notification to the terminal apparatus 200 within the communication range (S141) and then transmits MCCH/MCH/PMCH to the terminal apparatus 200 (S143). Moreover, the details of MCCH, MCH, and PMCH will be separately described later.

Subsequently, the target MBMS content is transferred from the MB-SC 460 to the MBMS gateway 440, and the MBMS content is IP multicast from the MBMS gateway 440 to the base station 100 (S145). The base station 100, when receiving the MBMS content from the MBMS gateway 440, transmits MCCH/MCH/PMCH to the terminal apparatus 200. In other words, the base station 100 broadcasts the received MBMS content (S147).

The example of the MBMS session start procedure in LTE is described above with reference to FIG. 7. On the other hand, there is a possibility that, in 5G NR, a procedure for starting a session from the terminal apparatus is added to the existing session start procedure. This is because it is possible to change the content delivery time for each terminal apparatus in the MBMS service provided using the UE-specific beam.

(Radio Access Network of MBMS)

Subsequently, the characteristics of the MBMS in the RAN is now described.

(1) Logical Channel for MBMS

The multimedia broadcast multicast service (MBMS) is provided over two logical channels of multicast transport channel (MTCH) and multicast control channel (MCCH). These two channels are mapped to PMCH (PHY Multicast Channel) as physical channels. In the PMCH, both the MCCH and the MTCH are sent, and scheduling information for mapping between the MBMS session and the PMCH generated as MAC signaling is also sent. This Mac signaling is sent in the header of the PMCH.

(2) Physical Channel for MBMS

Figure 8:
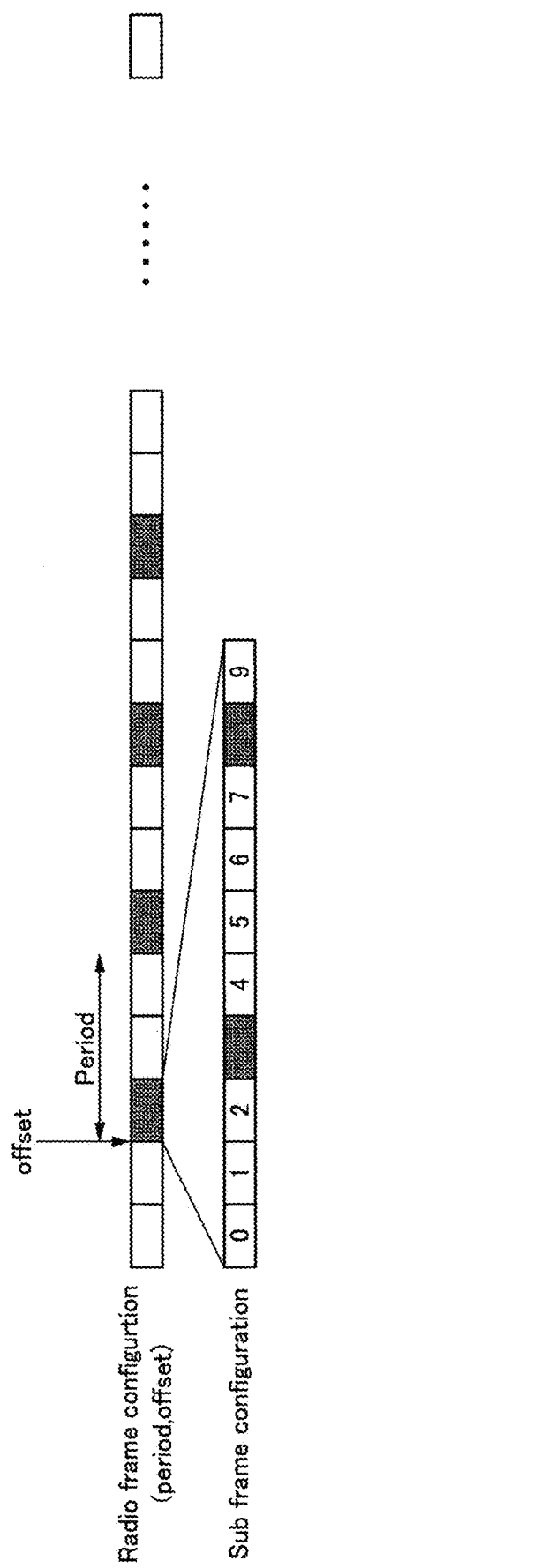
FIG. 8 shows an example of a frame structure upon using MBMS.

The PMCH uses a cyclic prefix having a relatively long CP length called extend CP. This is to constitute a single-frequency network for combining signals from a plurality of base stations. In LTE, one radio frame has 10 sub frames of which sub frames in which MBMS single-frequency network (MBSFN) is usable are designated semi-statically to be used. In one example, FIG. 8 illustrates an example of a frame structure in a case of using the MBMS. In FIG. 8, the marked sub frames schematically show sub frames in which the MBSFN is usable. In addition, the marked frames schematically show a frame including a sub frame in which the MBSFN is usable.

Some of the sub frames for MBSFN are used for PDCCH and PDSCH, but the PDCCH is used not for MBMS but for transmission of uplink scheduling information necessary for ordinary unicast traffic. Thus, the PDSCH portion in the sub frames for MBSFN is used for MBMS, and the PMCH is transmitted by the PDSCH.

(3) MBMS Session

In the present disclosure, one program is also referred to as an MBMS session. In this case, the MBMS session is mapped to the PMCH (PHY Multicast Channel) that is the physical channel. In addition, the PMCH is mapped to a sub frame allocated for the MBMS.

(4) MBMS Service Area

The MBMS service area corresponds to an area where one MBMS service is provided. In addition, the MBSFN area corresponds to an area that constitutes a single-frequency network (SFN). In the MBSFN area, it is possible to set up to eight areas for one base station. In a case where the SFN is configured, a plurality of base stations cooperates and transmits the same content.

Moreover, in 5G, it can be assumed that the MBMS session is provided to each terminal apparatus using the UE-specific beam. In the existing MBMS, the SFN technology described later is used, so it is not necessary to consider handover. On the other hand, in 5G, a mechanism corresponding to the MBMS handover is necessary due to the above-described characteristics. Thus, in one example, it can be necessary to notify the number of the MBMS session from the switching source base station to the switching destination base station. In this description, in a case where a beam necessary for beam recovery is provided from another base station (e.g., a base station in an adjacent cell), it is also possible to reduce the latency by including the MBMS session in a beam recovery request.

(5) SFN

The single-frequency network (SFN) is the technology in which the same signal is transmitted simultaneously at the same time and frequency from a plurality of base stations (eNodeBs) and the plurality of downlink signals is regarded as a reflected wave within the range of the cyclic prefix (CP), combined, and received, resulting in improving the signal strength. In the case of broadcasting, a wide reception range of the terminal apparatus is necessary, so the SFN can be used in some cases.

(6) MBMS Scheduling

In some cases, it is difficult for a terminal apparatus to receive a program without knowing where the base station (eNodeB) transmits the program. In such a case, the terminal apparatus is necessary to acquire scheduling information (i.e., information indicating where transmission is being performed).

Figure 9:
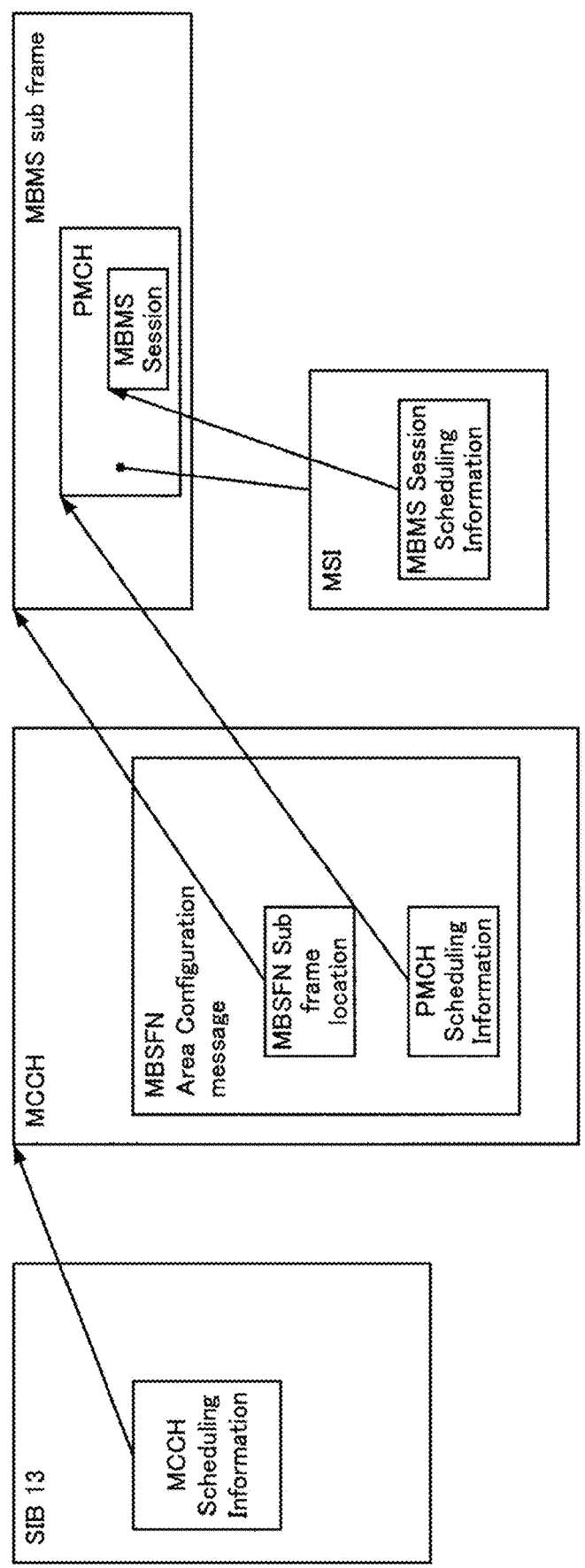
FIG. 9 is a diagram illustrated to describe an overview of information associated with an MBMS session.

The scheduling is performed in accordance with the procedure described below. The details of each procedure are described below with reference to FIG. 9. FIG. 9 is a diagram illustrated to describe an overview of information associated with an MBMS session.

Specifying radio frame and sub frame
MBSFN area configuration
Specifying MBMS session (Specifying Radio Frame and Sub Frame)

The location of the MCCH is specified in the SIB 13 of the system information. Specifically, the location of a radio frame including the MCCH is specified by a period and an offset. Furthermore, it is specified which sub frame in each radio frame includes the MCCH. The location of the MCCH is actually the PMCH, so the MCCH is transmitted in the PDSCH portion of the MBSFN sub frame.

(MBSFN Area Configuration)

The MCCH includes the MBSFN area configuration. The MBSFN area configuration specifies which sub frame where the MBSFN is performed. The specifying of the sub frame is settable by a period and an offset of a radio frame. In this case, it is possible to set simultaneously eight types of different periods and offsets for the specifying of the sub frame. In addition, which sub frame in the radio frame is used is also set. Such an operation allows a sub frame usable for MBMS to be determined. In the sub frames for MBMS determined as described above, how to allocate the PMCH is also specified. The PMCH can set up to 16 channels.

(Specifying of MBMS Session)

It is possible to set up to 30 MBMS sessions (i.e., programs) for 16 PMCHs determined as described above. As a specific example, MBMS sessions 0 and 1 can be set for PMCH0, and MBMS sessions 2, 3, 4, 5, and 6 can be set for PMCH1.

How to map the MBMS session to the PMCH is specified using the Mac signaling sent by the PMCH. The Mac signaling is a kind of RRC signaling in the SIB13, so it is said that the MBMS scheduling is performed by a combination of RRC signaling and Mac signaling.

In 5G, it is conceivable that the MBMS session can be provided to each terminal using the UE-specific beam. In this case, the SFN is not necessary to be used, and there is a possibility that the terminal apparatus is able to receive the delivery of television broadcast at the desired time. The content that is broadcast in the MBMS session is transmitted from the BM-SC to each base station (eNodeB) via the MBMS gateway. This content can be provided as a broadcast to the terminal apparatus at a time desired by the terminal apparatus as long as the content is held as a cache in the base station. In a case where the cache capacity has a physical limit, the expiration date can be given to the information of the MBMS session disclosed in the SIB. The location where the existing MBMS session is provided is disclosed on the PMCH specified by the information of the radio frame and sub frame and the location of the PMCH in the sub frame. On the other hand, in the case where the MBMS service is provided using the beam, it is also possible to disclose the information of the MBMS session as follows.

Disclosure is performed as before by system information embedded in performing beam forming during beam management. Moreover, beam management is a procedure for identifying an appropriate beam between a base station and a terminal apparatus.

In a procedure after determining an appropriate beam between a base station and a terminal apparatus, the provision of MBMS information is notified on the downlink control channel (DCI).

(7) Entity for Receiving MBMS

The above-mentioned MBMS service can be provided to both the terminal apparatus in the RRC idle mode and the terminal apparatus in the RRC connected mode. Thus, it is also possible for a terminal in the RRC idle mode to receive the various information described above.

(8) MCS (Modulation Scheme) Used in MBMS

As described above in connection with the network architecture, in the existing MBMS in LTE, the MCS can be changed by the MCE, but it is the broadcasting, so the frequency to be changed is small. Thus, in the existing MBMS in LTE, in one example, a common MCS that is preset for all terminal apparatuses is used.

On the other hand, in 5G, it is conceivable that the MBMS session is provided to each terminal apparatus using a UE-specific beam. In such a case, it is possible to provide the MBMS service by changing the MCS between the base station and the terminal apparatus. Furthermore, in a case where the beam is blocked by an obstacle such as a person or a car located between the base station and the terminal apparatus, it is necessary, in some cases, to switch the beam used for communication into that from another base station. In such a case, there is a possibility that an MCS different from the MCS used in the beam before the switching is used for the beam after the switching, and it can be assumed that the MCS before and after the switching is discontinuous.

(9) Feedback Information from Terminal Apparatus

The feedback information from a terminal apparatus is not specified in the MBMS in LTE at present. There is the mixed mode in which both ordinary LTE and MBMS are operated, but even in this case, feedback regarding the MBMS is not specified as a standard.

3. TECHNICAL FEATURES

Technical features of the communication system according to an embodiment of the present disclosure are now described.

(Basic Configuration)

A basic configuration of the communication system according to an embodiment of the present disclosure is first described. In 5G, the beam forming technique that enables the concentration of radio wave energy in a particular direction is used to compensate for attenuation of radio wave propagation of a relatively high frequency in the 6 GHz to 100 GHz range. In a situation where a beam is emitted in a particular direction by applying the beam forming technique in this way, the number of terminal apparatuses existing within the range of the beam is considerably limited. In addition, among the limited terminal apparatuses that are present in the area covered by the beam, the number of terminal apparatuses desiring to deliver the same program is also considerably limited.

Thus, in the 5G MBMS, the broadcasting content is transmitted to each base station by multicast during transmission in the core network, and in the subsequent radio access network (RAN), the broadcasting content (i.e., MBMS service) is provided to the terminal apparatus by multicast using a UE-specific beam (i.e., transmission by specifying a destination).

The procedure for delivering the MBMS content to the terminal apparatus by multicast the MBMS content (i.e., the broadcasting content) transmitted by multicast to the base station using a UE-specific beam is, in one example, as follows.

The procedure for transmitting the MBMS content to the base station is similar to the procedure in LTE described with reference to FIG. 7. In this description, for the MBMS content transmitted from the MB-SC 460 to the base station 100 via the MBMS gateway 440, the information indicating that the base station 100 is deliverable is provided from the base station 100 to the terminal apparatus 200 as system information. Moreover, the information indicating that the base station 100 is capable of delivering the MBMS content is provided to the terminal apparatus 200 after or before transmission of the MBMS content to the base station 100.

Figure 10:
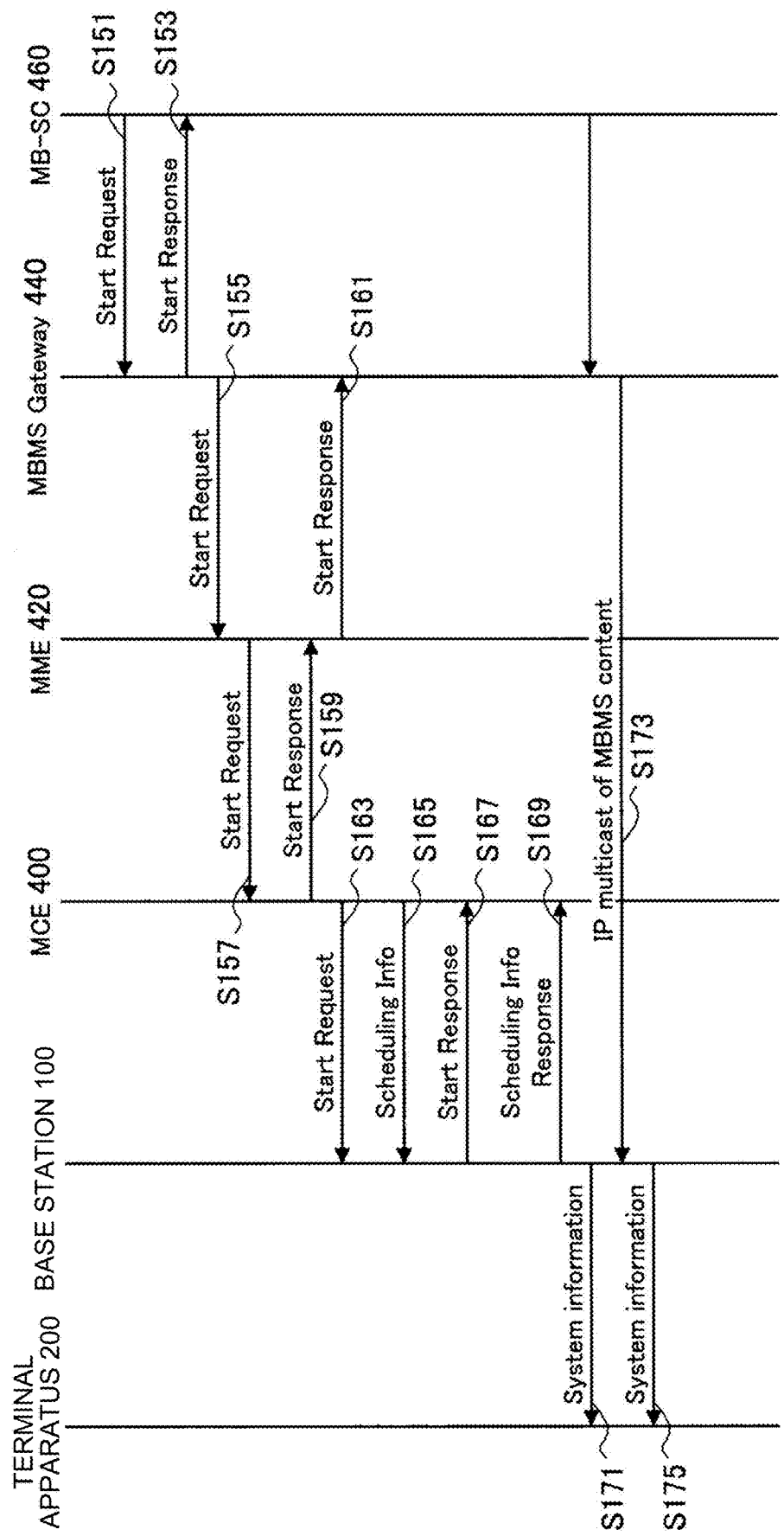
FIG. 10 is a schematic sequence diagram illustrating an example of a procedure for providing a program to each terminal apparatus using a directional beam in a communication system according to the present embodiment.

The procedure of the communication system according to the present disclosure differs from the procedure in LTE described with reference to FIG. 7 in that the base station 100 may necessarily not immediately deliver the multicast MBMS content to the terminal apparatus. An example of a procedure for providing a program to each terminal apparatus using a directional beam in the communication system according to an embodiment of the present disclosure is now described with reference to FIG. 10. FIG. 10 is a schematic sequence diagram illustrating an example of a procedure for providing a program to each terminal apparatus using a directional beam in the communication system according to an embodiment of the present disclosure. Moreover, in FIG. 10, the steps denoted by reference numerals S151 to S169 are substantially similar to the steps denoted by reference numerals S121 to S139 in FIG. 7, respectively, and so detailed description thereof is omitted.

In a case where the target MBMS content is transferred (IP multicast) from the MB-SC 460 to the MBMS gateway 440, the MBMS content is IP multicast from the MBMS gateway 440 to the base station 100 (S173). The base station 100 (the notification unit 155) can provide the terminal apparatus 200 with information regarding the MBMS content using the system information before the MBMS content is IP multicast from the MBMS gateway 440 (S171). In addition, as another example, the base station 100 (the notification unit 155) can provide the terminal apparatus 200 with information regarding the MBMS content using the system information after the MBMS content is IP multicast from the MBMS gateway 440 (S175).

As described above with reference to FIG. 10, the base station 100 (the notification unit 155) notifies information indicating what kind of program (i.e., MBMS content) the relevant base station 100 can provide to the terminal apparatus 200 using information that is commonly notified to a plurality of terminal apparatuses 200, such as system information. The system information is provided as a broadcast signal that all terminal apparatuses are receivable in the RRC idle state during beam sweeping.

Figure 11:
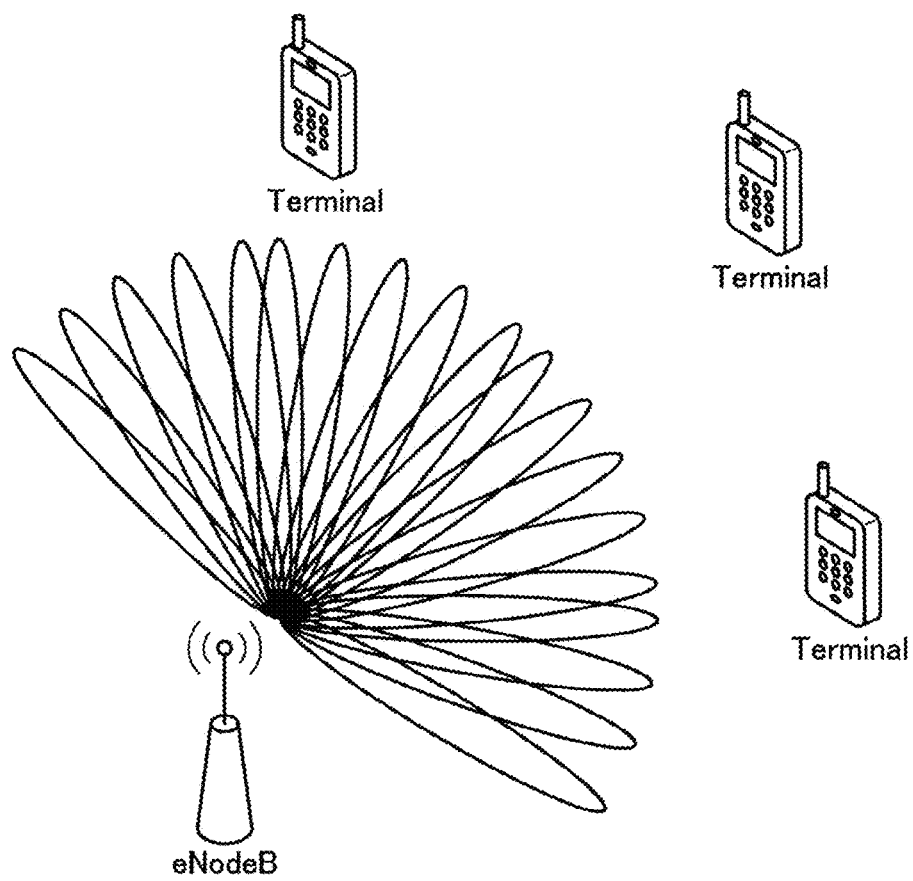
FIG. 11 is a diagram illustrated to describe an overview of beam sweeping.
Figure 12:
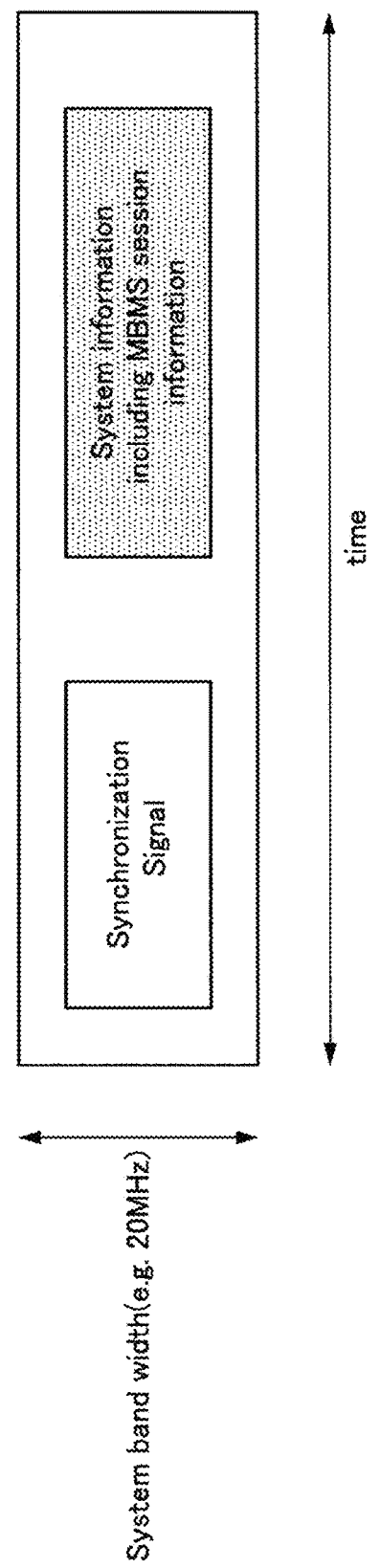
FIG. 12 is a diagram illustrated to describe an overview of beam sweeping.

An overview of beam sweeping is now described with reference to FIGS. 11 and 12. FIGS. 11 and 12 are diagrams illustrated to describe the overview of beam sweeping. As illustrated in FIG. 11, the base station performs beam sweeping using a plurality of beams every predetermined period (e.g., 10 ms or 20 ms) as if it were a lighthouse light. Each beam transmitted by the beam sweeping includes, in one example, synchronization signal that is a signal for synchronization, system information, and the like, as illustrated in FIG. 12. Each of a plurality of beams transmitted from one base station by one time of beam sweeping (i.e., a plurality of beams belonging to the beam sweeping) includes system information indicating common contents. This is because it is not necessary to change the contents of system information for each beam due to the characteristics of providing information to an unspecified number of terminal apparatuses. Thus, information common to each beam is provided as information regarding the MBMS session provided in association with the system information (MBMS session information). Moreover, although an example in which a beam including synchronization information is used is described above, in a case where the beam is used to provide common information to a plurality of terminal apparatuses such as system information, the beam may not necessarily include a synchronization signal.

Figure 13:
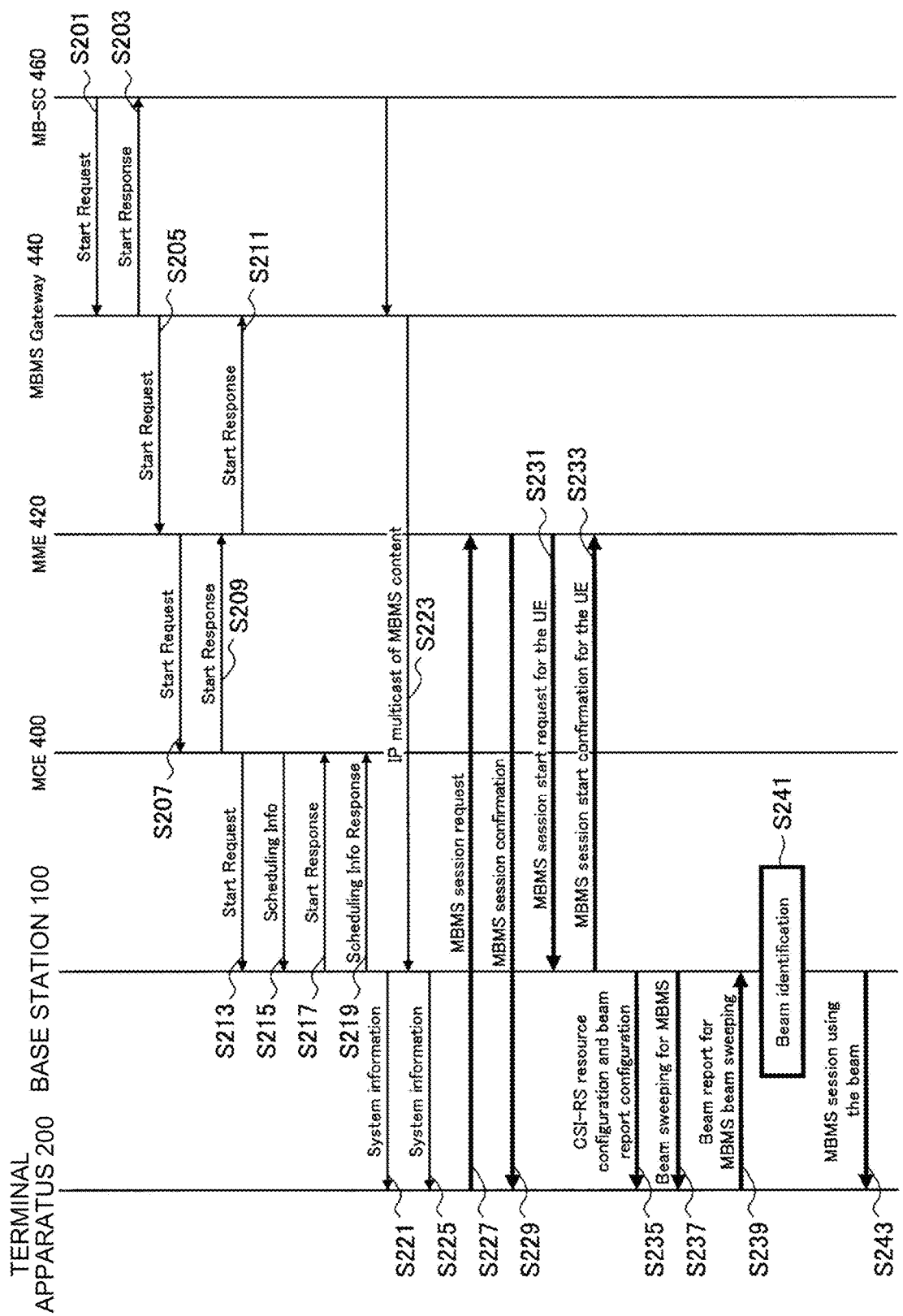
FIG. 13 is a schematic sequence diagram illustrating an example of a procedure for providing a program to each terminal apparatus using a directional beam in a communication system according to the present embodiment.

An example of a procedure for providing a program to each terminal apparatus using a directional beam in the communication system according to an embodiment of the present disclosure is now described in more detail with reference to FIG. 13. FIG. 13 is a schematic sequence diagram illustrating an example of a procedure for providing a program to each terminal apparatus using a directional beam in the communication system according to an embodiment of the present disclosure. Moreover, in FIG. 13, the steps denoted by reference numerals S201 to S225 are similar to the steps denoted by reference numerals S151 to S175 in FIG. 10, respectively, and so detailed description thereof is omitted.

As illustrated in FIG. 13, the terminal apparatus 200 (the notification unit 247) delivers an MBMS session request to the MME 420 on the side of a network for the MBMS content desired to be delivered, on the basis of the information regarding the MBMS session associated with the system information (e.g., information regarding the MBMS session that is capable of being provided by the base station 100) (S227). The MME 420, when receiving the MBMS session request from the terminal apparatus 200, replies an MBMS session confirmation to the terminal apparatus 200 (S229). Moreover, it is possible for the communication between the terminal apparatus 200 and the MME 420 to be achieved by, in one example, the non-access stratum (NAS) signaling.

Subsequently, the MME 420 transmits an MBMS session start request for the UE to the base station 100 in which the terminal apparatus 200 that is the transmission source of the MBMS session request is placed in the communication range (cell) in response to the MBMS session request (S231). The base station 100, when receiving the MBMS session start request for the UE from the MME 420, replies an MBMS session start confirmation for the UE to the MME 420 (S233). Moreover, the MBMS session start request for the UE transmitted to the base station 100 corresponds to an example of a "request for content delivery".

Further, the base station 100 transmits, to the terminal apparatus 200, various types of information used to identify a beam used for delivering the MBMS content to the terminal apparatus 200 (S235). Examples of the information include information regarding the resource of beam sweeping (hereinafter also referred to as "MBMS beam sweeping") for delivering the MBMS content (CSI-RS resource configuration) and information regarding the settings for terminal apparatus 200 to report an observation result of a beam transmitted by the beam sweeping (beam report configuration). Then, the base station 100 performs MBMS beam sweeping (S237).

The terminal apparatus 200 (measuring unit 245) measures a predetermined signal (e.g., a reference signal) in the beam transmitted by the MBMS beam sweeping, and identifies a beam desired for receiving the MBMS content depending on a result of the measurement. Then, the terminal apparatus 200 (notification unit 247) reports information corresponding to the result obtained by identifying the beam to the base station 100 (S239).

The base station 100 identifies a beam used for delivering the MBMS content to the terminal apparatus 200 in response to the report from the terminal apparatus 200 (S241). Then, the base station 100 (the communication control unit 241) delivers (e.g., Multicast) the MBMS content that is previously multicast from the MBMS gateway 440 to the terminal apparatus 200 using the UE-specific beam (i.e., the identified beam) (S243).

Moreover, in the example described above, the MBMS content is provided using a beam different from the beam used in ordinary unicast by performing beam sweeping for MBMS and beam reporting for MBMS. This is because it can be assumed that a beam having a wider beam width than the above-mentioned unicast beam is used for providing content (e.g., MBMS content) as a beam for broadcasting. In other words, this is because, in a case where such a condition is assumed, it can be more desirable to obtain a beam for MBMS by a procedure different from a beam used for ordinary unicast.

It is natural that a case where it is difficult to use a beam for MBMS separately from a beam for ordinary unicast can be assumed. In such a situation, in a case where there is a beam for unicast being previously in use, the beam can be used for another purpose as a beam for MBMS. In this case, the procedure for newly identifying a beam can be omitted.

A description of the difference between a case where unicast is performed in all of a series of paths through which MBMS content is transmitted and a case where MBMS content is transmitted through the series of paths in the communication system according to the present embodiment is now given. Moreover, the case where unicast is performed in all of the series of paths corresponds to, specifically, a case where unicast is used for transmitting MBMS content in both core network (CN) and radio access network (RAN). In the communication system according to the present embodiment as described above, the transmission of MBMS content from the MB-SC to the base station via the MBMS gateway is performed using multicast. Thus, this makes it possible to reduce the amount of signaling for the transmission and reduce an increase in traffic, as compared to a case where the transmission of the MBMS content on the path is performed using unicast.

Moreover, it is expected that a new MBMS session request and a beam sweeping procedure dedicated to MBMS are necessary to implement the mechanism as described above. As described above, it can be assumed that different beam widths are set for the ordinary unicast beam and the MBMS beam. Thus, it is desirable to manage the beam for MBMS separately from the beam for ordinary unicast in some cases. Such management can be necessary, even in the case where the terminal apparatus to which the beam for MBMS is once allocated makes a transition to the RRC idle state, so that the beam for MBMS is receivable in the RRC idle state. Moreover, the details of a technique for enabling the terminal apparatus to receive the beam for MBMS in the RRC idle state (i.e., enabling reception of the MBMS content) will be described separately later as a modification.

First Modification

Subsequently, a modification of the communication system according to an embodiment of the present disclosure is described. Moreover, the present modification is also referred to as a "first modification".

In LTE, it is possible to receive the DL MBMS service without allowing the terminal apparatus to perform signaling to the base station. Thus, in LTE, even in the RRC idle state in which the terminal apparatus is not registered in the base station (i.e., the communication between the terminal apparatus and the base station is not established), it is possible for the terminal apparatus to receive the MBMS content. On the other hand, in the case where the MBMS content is delivered to the terminal apparatus by multicast using a UE-specific beam as described above, the terminal apparatus may be necessary to be in a state registered in the base station, that is, in the RRC connected state. On the other hand, the increase in the number of terminal apparatuses in the RRC connected state may consume the memory area of the base station. In addition, the UL or DL signaling is necessary to keep the RRC connected state, so there is a possibility to increase the signaling overhead.

In view of the above situation, the present modification provides the technology enabling the terminal apparatus to keep the beam for MBMS provided in the RRC connected state, even in the case of making the state transition to the RRC idle state.

Figure 14:
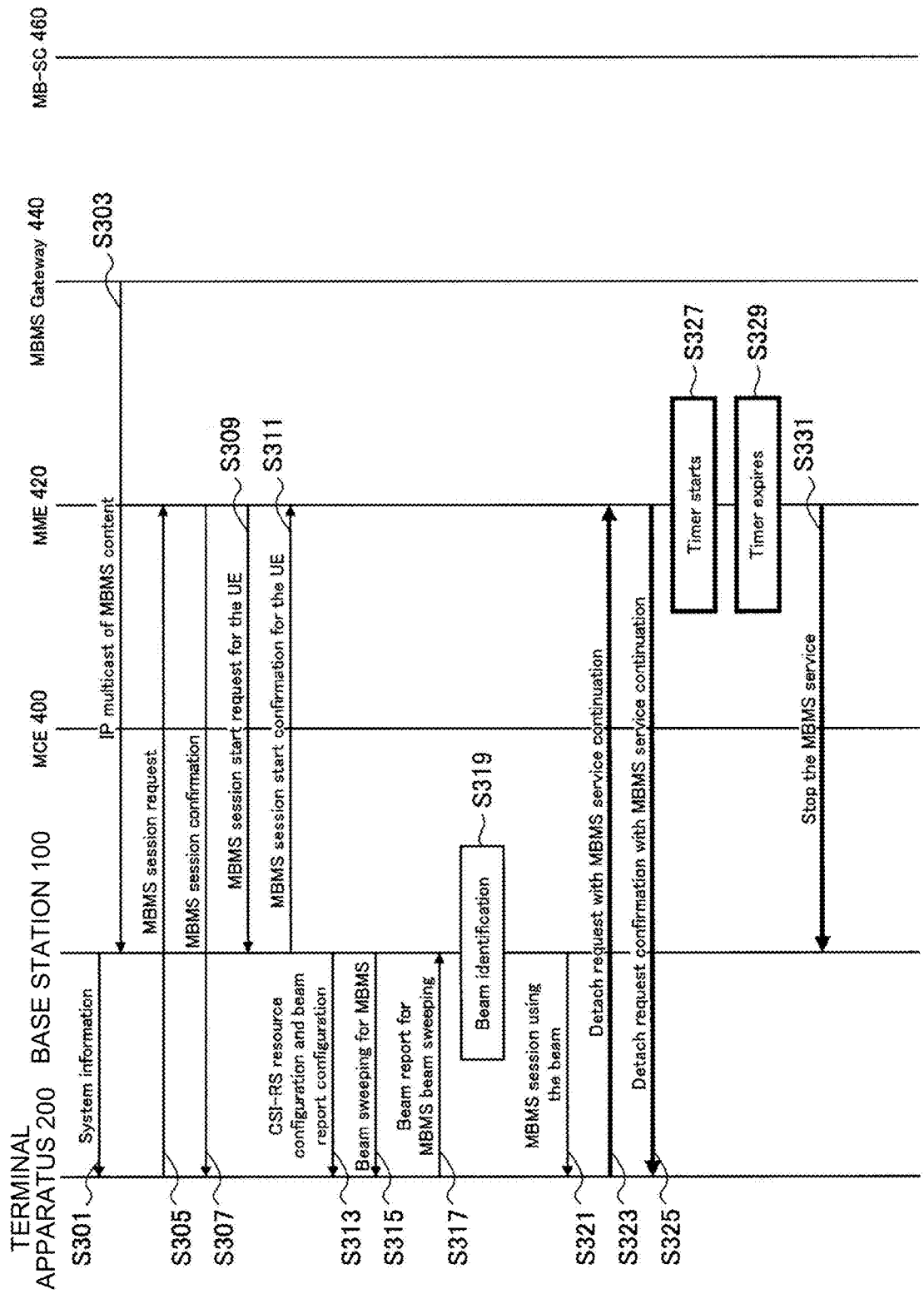
FIG. 14 is a schematic sequence diagram illustrating an example of a procedure for providing a program to each terminal apparatus using a directional beam in a communication system according to a first modification.

For example, FIG. 14 is a schematic sequence diagram illustrating an example of a procedure for providing a program to each terminal apparatus using a directional beam in a communication system according to the present modification. Moreover, the procedure illustrated in FIG. 14 is executed after the provision of MBMS content using a UE-specific beam to a particular terminal apparatus is started by the procedure described with reference to FIG. 13. Specifically, the steps denoted by reference numerals S301 and S303 correspond to the steps denoted by reference numerals S221 and S223 in FIG. 13, respectively. Moreover, the steps denoted by reference numerals S305 to S321 correspond to the steps denoted by reference numerals S227 to S243 in FIG. 13, respectively. Therefore, detailed description of the steps denoted by reference numerals S301 to S321 is omitted.

As illustrated in FIG. 14, after the provision of the MBMS content using the UE-specific beam is started, the terminal apparatus 200 (the notification unit 247) transmits a detach request to the MME 420 to make the transition to the RRC idle state. At this time, in the communication system according to the present modification, the terminal apparatus 200 can indicate the intention to continue receiving the provision of the MBMS service using the beam set at this time (that is, receiving the MBMS content) in response to the Detach request (S323). The MME 420, when receiving the Detach request transmitted from the terminal apparatus 200, notifies the terminal apparatus 200 that the Detach request is confirmed and the provision of the MBMS service continues (S325).

Moreover, a state or mode in which communication used for notification of information from the terminal apparatus 200 to the base station 100, such as the RRC idle state, is restricted corresponds to an example of a "first mode". On the other hand, a state or mode in which the communication used for notification of information from the terminal apparatus 200 to the base station 100, such as the RRC connected state, is established corresponds to an example of a "second mode". Moreover, the communication restricted in the first mode corresponds to an example of "first wireless communication". In addition, as described above, in the communication system according to the present modification, even in the case of making the state transition to the RRC idle state (i.e., the first mode), the communication for providing the MBMS service is kept in response to the request from the terminal apparatus. The communication kept in response to the request from the terminal apparatus even in the case of making the state transition to the first mode, that is, the communication for providing the MBMS service corresponds to an example of "second wireless communication". In other words, in the communication system according to the present modification, even in a case where the above-mentioned first wireless communication and second wireless communication are set and make a transition to the first mode (e.g., the RRC idle state), the first wireless communication is restricted. However, the second wireless communication is kept in response to a request from the terminal apparatus. In addition, in the example illustrated in FIG. 14, the MME 420 corresponds to an example of a "device that manages a transition between the first mode and the second mode".

Moreover, in the communication system according to the present modification, in order to continue to provide the MBMS service, the control can be performed such that the terminal apparatus 200 makes a transition to the RRC connected state again within a predetermined period (e.g., every hour) and transmits an MBMS session request to the MME 420. In this case, in one example, in a case where the MME 420 receives the detach request indicating that the terminal apparatus 200 attempts to continue to receive the provision of the MBMS service, the MME 420 starts timing for a predetermined period by a timer (S327). Then, if the MBMS session request is not transmitted from the terminal apparatus 200 before the expiration of the timer (S329), the MME 420 instructs the base station 100 to stop providing the corresponding MBMS service (S331).

For the above-described control, in one example, the beam width of the beam used for providing the MBMS service is wider than the beam used for ordinary unicast, the coverage area is relatively wide, and the affinity with the situation where the terminal apparatus 200 moves less (ideally, the terminal apparatus 200 does not move) is high.

Figure 15:
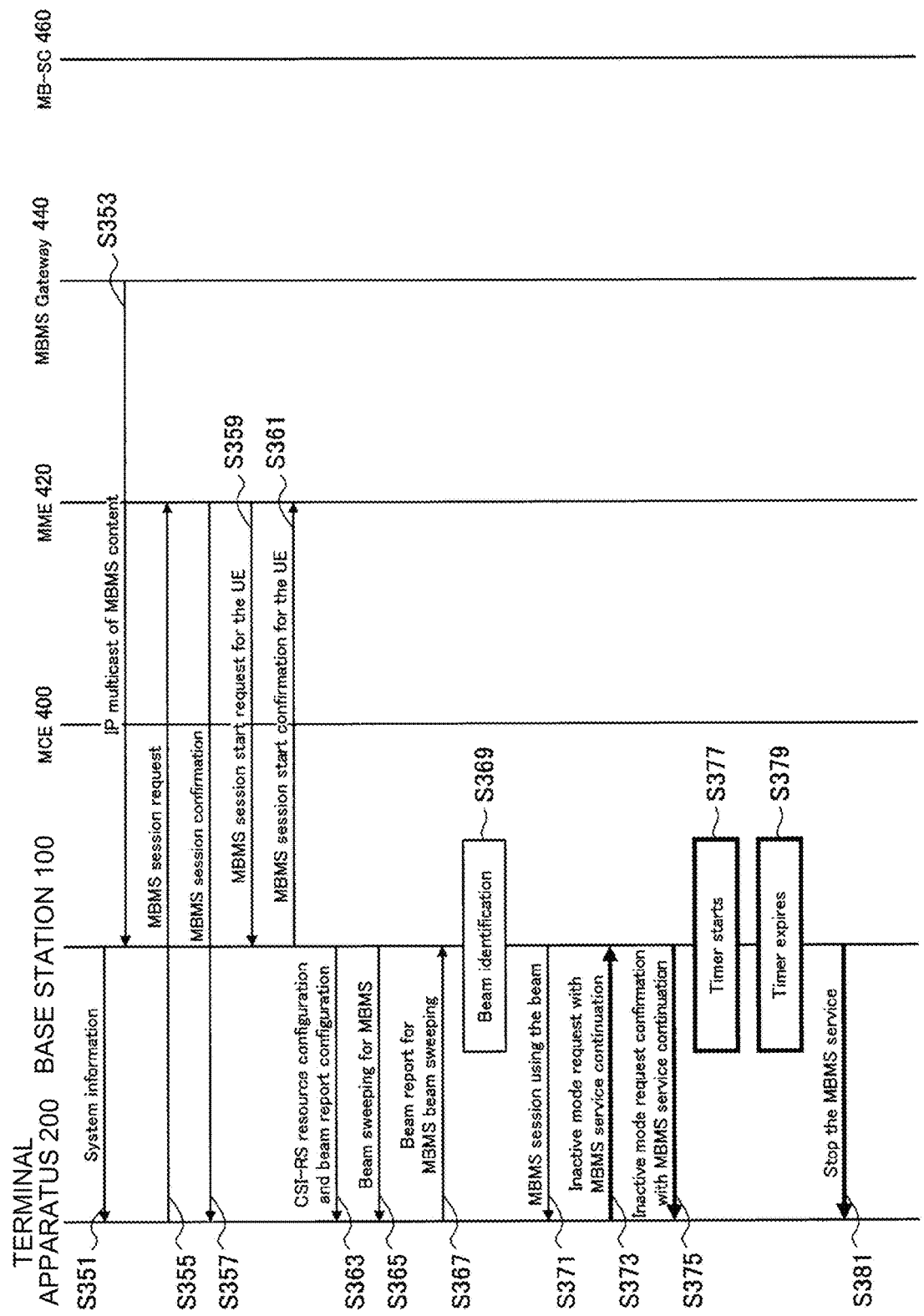
FIG. 15 is a schematic sequence diagram illustrating another example of a procedure for providing a program to each terminal apparatus using a directional beam in a communication system according to the first modification.

Moreover, the above description is given focusing on the case where the terminal apparatus 200 makes a transition to the RRC idle state. On the other hand, even in a case where the terminal apparatus 200 makes a transition to the inactive mode, it is also possible to control in such a way that the provision of the MBMS service continues during the relevant mode on the basis of a similar concept to the example described with reference to FIG. 14. For example, FIG. 15 is a schematic sequence diagram illustrating another example of a procedure for providing a program to each terminal apparatus using a directional beam in a communication system according to the present modification. Specifically, FIG. 15 illustrates an example of a procedure for controlling the provision of the MBMS service to the terminal apparatus 200 to continue even in the case where the terminal apparatus 200 makes a transition to the inactive mode. Moreover, the steps denoted by reference numerals S351 to S371 correspond to the steps denoted by reference numerals S301 to S321 in FIG. 14, respectively. Therefore, detailed description of the steps denoted by reference numerals S351 to S371 is omitted.

As illustrated in FIG. 15, the terminal apparatus 200 (the notification unit 247), when making a transition to the inactive mode, transmits an inactive mode request to the base station 200. At this time, in the communication system according to the present modification, the terminal apparatus 200 can indicate the intention to continue receiving the provision of the MBMS service using the beam set at this time (that is, receiving the MBMS content) in response to the inactive mode request (S373). In other words, the terminal apparatus 200 requests the base station 100 to make a transition to a mode in which the operation relating to transmission and reception other than the operation of receiving the provision of the MBMS service (i.e., the reception of the MBMS content) is stopped. The base station 100 (the notification unit 155), when receiving the inactive mode request transmitted from the terminal apparatus 200, notifies the terminal apparatus 200 that the inactive mode request is confirmed and the provision of the MBMS service continues (S375).

Further, in the example illustrated in FIG. 15, the provision of the MBMS service to the terminal apparatus 200 that makes a transition to the inactive mode can be managed by a timer on the basis of a similar concept to the example described with reference to FIG. 14. In other words, in this case, the base station 100 (the communication control unit 155), when receiving, from the terminal apparatus 200, the inactive mode request indicating that the user intends to continue to receive the MBMS service, starts timing for a predetermined period using a timer (S377). Then, if the base station 100 (the communication control unit 155) does not receive the notification of the MBMS session request from the terminal apparatus 200 via the MME 420 before the expiration of the timer (S379), the base station 100 stops providing the MBMS service to the terminal apparatus 200 (S381). Moreover, in the example illustrated in FIG. 15, the inactive mode corresponds to an example of the "first mode". In other words, in the example illustrated in FIG. 15, the base station 100 corresponds to an example of a "device that manages a transition between the first mode and the second mode".

A supplementary description is now given of the case where the signaling from the terminal apparatus to the base station occurs again in the communication system according to the present modification. In one example, even if the terminal apparatus moves less, in some cases, it is desirable to change the modulation and coding scheme (MCS) applied when the terminal apparatus 200 receives the content due to the fluctuation of the channel. Thus, in one example, in a case where the reception quality of the MBMS content (e.g., reference signal received power (RSRP) or reference signal received quality (RSRQ)) fluctuates by a certain value or more, the terminal apparatus can request the base station to change the MCS for the beam used for delivering the relevant MBMS content. Moreover, examples of the index of the reception quality of the MBMS content include the reception power of channel state information reference signal (CSI-RS) included in the beam used for delivering the relevant MBMS content, the amount of interference by other signals, and the like. In addition, the terminal apparatus, when requesting the base station to change the MCS, makes a transition to the RRC connected state.

Figure 16:
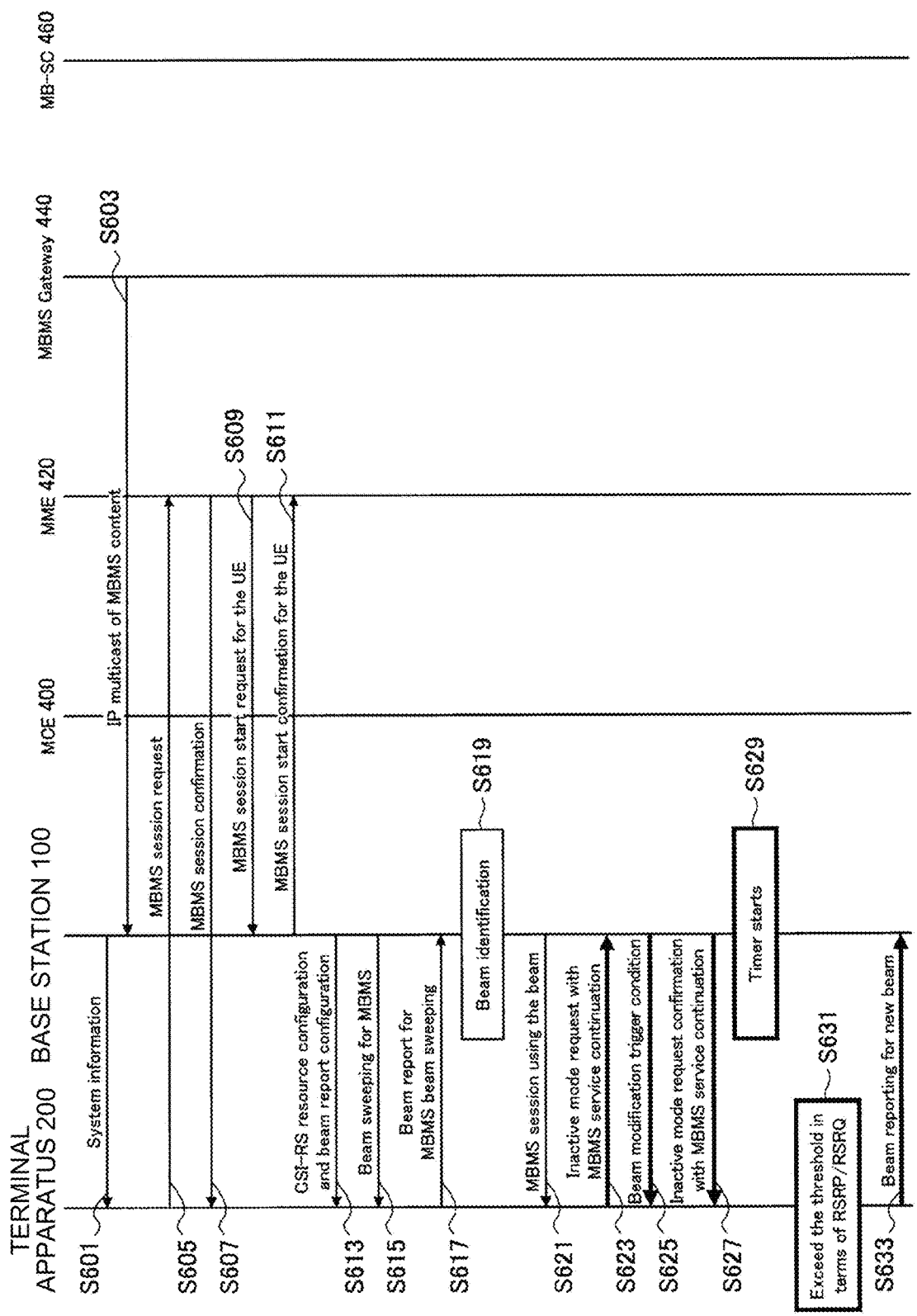
FIG. 16 is a schematic sequence diagram illustrating another example of a procedure for providing a program to each terminal apparatus using a directional beam in a communication system according to the first modification.

For example, FIG. 16 is a schematic sequence diagram illustrating another example of a procedure for providing a program to each terminal apparatus using a directional beam in a communication system according to the present modification. Specifically, FIG. 16 illustrates an example of a procedure for the terminal apparatus 200 to request the base station 100 to change the MCS. Moreover, the steps denoted by reference numerals S601 to S621 correspond to the steps denoted by reference numerals S351 to S371 in FIG. 15, respectively. Therefore, detailed description of the steps denoted by reference numerals S601 to S621 is omitted.

As illustrated in FIG. 16, the terminal apparatus 200 (the notification unit 247), when making a transition to the inactive mode, transmits an inactive mode request to the base station 200. At this time, the terminal apparatus 200 can indicate the intention to continue receiving the provision of the MBMS service using the beam set at this time (that is, receiving the MBMS content) in response to the inactive mode request (S623). This is similar to the example described with reference to FIG. 15. Moreover, the terminal apparatus 200 can determine whether or not to be necessary to modify a beam used for providing an MBMS service by using a state that can be determined in response to a wireless signal transmitted from the base station 100 (e.g., the quality of a transmitted beam) as a trigger (S625).

The base station 100 (the notification unit 155), when receiving the inactive mode request transmitted from the terminal apparatus 200, notifies the terminal apparatus 200 that the inactive mode request is confirmed and the provision of the MBMS service continues (S627). In addition, the base station 100 (the communication control unit 155), when receiving, from the terminal apparatus 200, the inactive mode request indicating the intention to continue to receive the MBMS service, can start timing for a predetermined period by a timer (S629). These steps are similar to the steps denoted by reference numerals S375 and S377 in FIG. 15.

In this stage, it is assumed that the fluctuation (e.g., decrease in reception quality) of the reception quality (e.g., RSRP/RSPQ) of the MBMS content in the terminal apparatus 200 exceeds a threshold (S631). In this case, the terminal apparatus 200 (the notification unit 247) can request the base station 100 to change the MCS for the beam used for delivering the MBMS content by performing beam reporting for a new beam to the base station 100 (S633).

The control as described above in the present modification makes it possible for the terminal apparatus to continue to keep the beam for the MBMS provided in the RRC connected state even in the case of making a transition to the RRC idle state or the inactive mode. In other words, the communication system according to the present modification makes it possible to limit the number of terminal apparatuses in the RRC connected state among the terminal apparatuses to which the MBMS content is delivered depending on the conditions. Thus, the communication system according to the present modification makes it possible to reduce the consumption of the memory area of the base station. In addition, in the communication system according to the present modification, it is possible to decrease the UL and DL signaling for keeping the RRC connected state, resulting in expecting an effect of reducing signaling overhead.

Second Modification

Subsequently, a modification of the communication system according to another embodiment of the present disclosure is described. Moreover, the present modification is also referred to as a "second modification".

In 5G, the beam forming technique that enables the concentration of radio wave energy in a particular direction is used to compensate for attenuation of radio wave propagation of a high frequency from 6 GHz to 100 GHz. The use of the beam forming technique allows the beam width of a beam emitted in a particular direction to be limited, so the area covered by the beam is limited compared to the case where the beam forming technique is not used. Under such circumstances, the number of terminal apparatuses that present within the range covered by the beam radiated in a particular direction may be more limited than the case where the beam forming technique is not used. In addition, the area covered by the beam is limited, so there is a possibility that the number of terminal apparatuses that desire to deliver the same program among the terminal apparatuses that present in the area can be further limited. In view of such a situation, in the 5G MBMS, a case can be assumed in which a delivery scheme capable of more efficiently delivering the program content (e.g., MBMS content) differs depending on the conditions at each time. Examples of an option of the method of delivering the program content include broadcast, multicast, unicast, and the like in the past employed in LTE or the like in addition to the multicast using the UE-specific beam described above. Moreover, in the following description, broadcast, multicast, and unicast employed in the past in LTE or the like can be referred to as "ordinary broadcast", "ordinary multicast", and "ordinary unicast", respectively.

To apply selectively delivery means that are more suitable from among the above-described examples as delivery means of broadcast content in a radio access network (RAN), the base station is important, in one example, to recognize which program content is delivered using which beam for each terminal apparatus. For the base station to grasp such a situation, in one example, it is possible to use the above-described counting function. Moreover, in LTE, a function similar to the counting function is defined. Specifically, in LTE, as described with reference to FIG. 5, the MCE 400 collects information from each terminal apparatus 200 by transmitting a counting request to the terminal apparatus 200 via the base station 100.

On the other hand, in the 5G MBMS, only by collecting information regarding a program that each terminal apparatus 200 desires to deliver, it is difficult for the base station to select the delivery means for delivering the content corresponding to the program in a more suitable manner. In other words, as described above, to apply selectively a more suitable delivery means, in one example, it is important to recognize which program content is delivered using which beam for each terminal apparatus.

Moreover, as described above with reference to FIG. 13, the base station is capable of recognizing an ID (MBMS session ID) of the MBMS content that the terminal apparatus desires to deliver on the basis of a request (the MBMS session start request for the UE) from the MME in response to the MBMS session request from the terminal apparatus to the MME. In addition, the base station is capable of recognizing a beam used for delivering the MBMS content on the basis of a report (beam report for MBMS beam sweeping) from the terminal apparatus. In other words, the base station is capable of determining whether or not it is possible to merge beam resources used for delivering the MBMS content with respect to at least some of two or more terminal apparatuses among the plurality of terminal apparatuses by using these pieces of information.

The determination by the base station as described above can be achieved by the implementation of the base station. Moreover, in this case, it is important what kind of modulation and coding scheme is used to deliver the broadcast content (MBMS content). The terminal apparatus is capable of notifying what type of modulation and coding scheme is desired to be applied using the channel quality indication (CQI). Moreover, it can be said that the CQI indicates the MCS. Thus, in the following description, it is assumed that the terminal apparatus notifies the base station of what type of MCS (i.e., the modulation and coding scheme) is desired to be applied.

In a case where the MCSs are approximately equal among a plurality of terminal apparatuses, in one example, the broadcast content can be provided to each of the plurality of terminal apparatuses by applying the MCS having lower communication quality. On the other hand, even in a case where the direction of the beam allocated to each of the plurality of terminal apparatuses is the same and the programs that each of the plurality of terminal apparatuses desires to deliver are the same, if the difference between the MCSs is large (e.g., the threshold or more), the base station can make a selection not to merge the beams. Moreover, in this case, the MCS corresponds to an example of "wireless communication settings" between the base station and the terminal apparatus.

Figure 17:
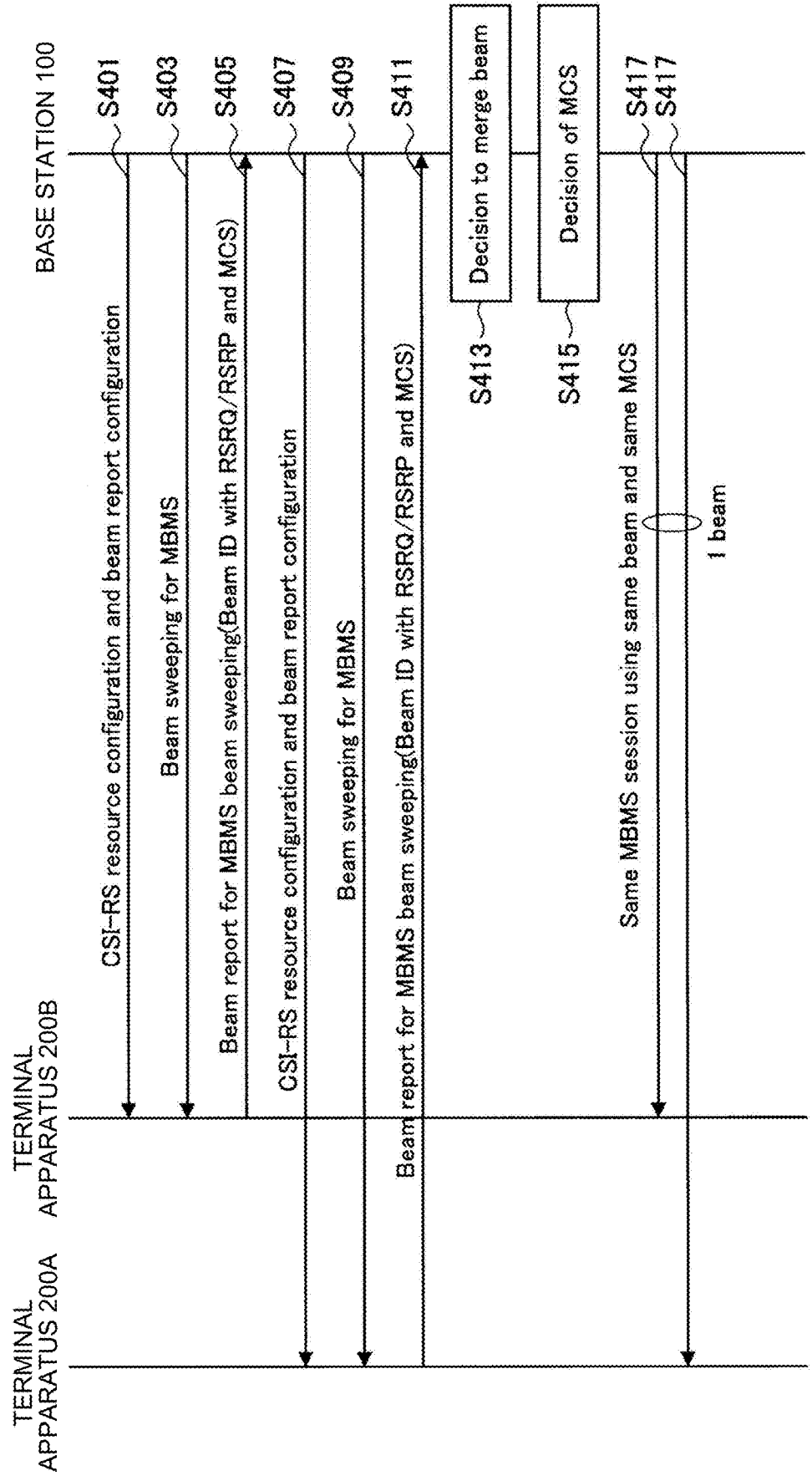
FIG. 17 is a schematic sequence diagram illustrating an example of a procedure for providing a program to each terminal apparatus using a directional beam in a communication system according to a second modification.

An example of a procedure of a series of processing steps of the communication system according to the present modification is now be described with reference to FIG. 17. FIG. 17 is a schematic sequence diagram illustrating an example of a procedure for providing a program to each terminal apparatus using a directional beam in the communication system according to the present modification. Moreover, in the example illustrated in FIG. 17, it is assumed that each of the terminal apparatuses 200A and 200B desires to deliver common MBMS content.

As illustrated in FIG. 17, the base station 100 transmits various types of information (e.g., such as CSI-RS resource configuration or beam report configuration) for identifying a beam used to deliver the MBMS content to the terminal apparatus 200B, to the terminal apparatus 200B (S401), and performs the MBMS beam sweeping (S403). The terminal apparatus 200B measures a predetermined signal (e.g., a reference signal) in the beam transmitted by the MBMS beam sweeping, and identifies a beam desired for receiving the MBMS content depending on a result of the measurement. Then, the terminal apparatus 200B reports information corresponding to the result obtained by identifying the beam to the base station 100 (S405). In this case, the terminal apparatus 200B can associate information regarding the MCS desired to be applied at the time of delivering the MBMS content with the report depending on the result of the measurement.

Similarly, the base station 100 transmits various types of information for identifying a beam used to deliver the MBMS content to the terminal apparatus 200A, to the terminal apparatus 200A (S407), and performs the MBMS beam sweeping (S409). The terminal apparatus 200A measures a predetermined signal (e.g., a reference signal) in the beam transmitted by the MBMS beam sweeping, and identifies a beam desired for receiving the MBMS content depending on a result of the measurement. Then, the terminal apparatus 200A reports information corresponding to the result obtained by identifying the beam to the base station 100 (S411). In this case, the terminal apparatus 200A can associate information regarding the MCS desired to be applied at the time of delivering the MBMS content with the report depending on the result of the measurement.

Subsequently, the base station 100 decides whether or not to merge the beams used for delivering the MBMS content to the terminal apparatuses 200A and 200B between the terminal apparatuses 200A and 200B depending on the report from the terminal apparatuses 200A and 200B (S413). Moreover, in this stage, it is assumed that base station 100 decides to merge beams between terminal apparatuses 200A and 200B. In addition, an example of the procedure of a series of processing steps relating to the above decision by the base station 100 will be described later in detail.

The base station 100, when deciding to merge beams between the terminal apparatuses 200A and 200B, decides the MCS to be applied to the delivery of the MBMS content to each of the terminal apparatuses 200A and 200B (S415). In this case, the base station 100 can decide the MCS to be applied to the delivery of the MBMS content to each of the terminal apparatuses 200A and 200B, in one example, depending on the information notified from the terminal apparatuses 200A and 200B. Then, the base station 100 delivers common MBMS content to each of the terminal apparatuses 200A and 200B by using the decided common beam (S417).

Figure 18:
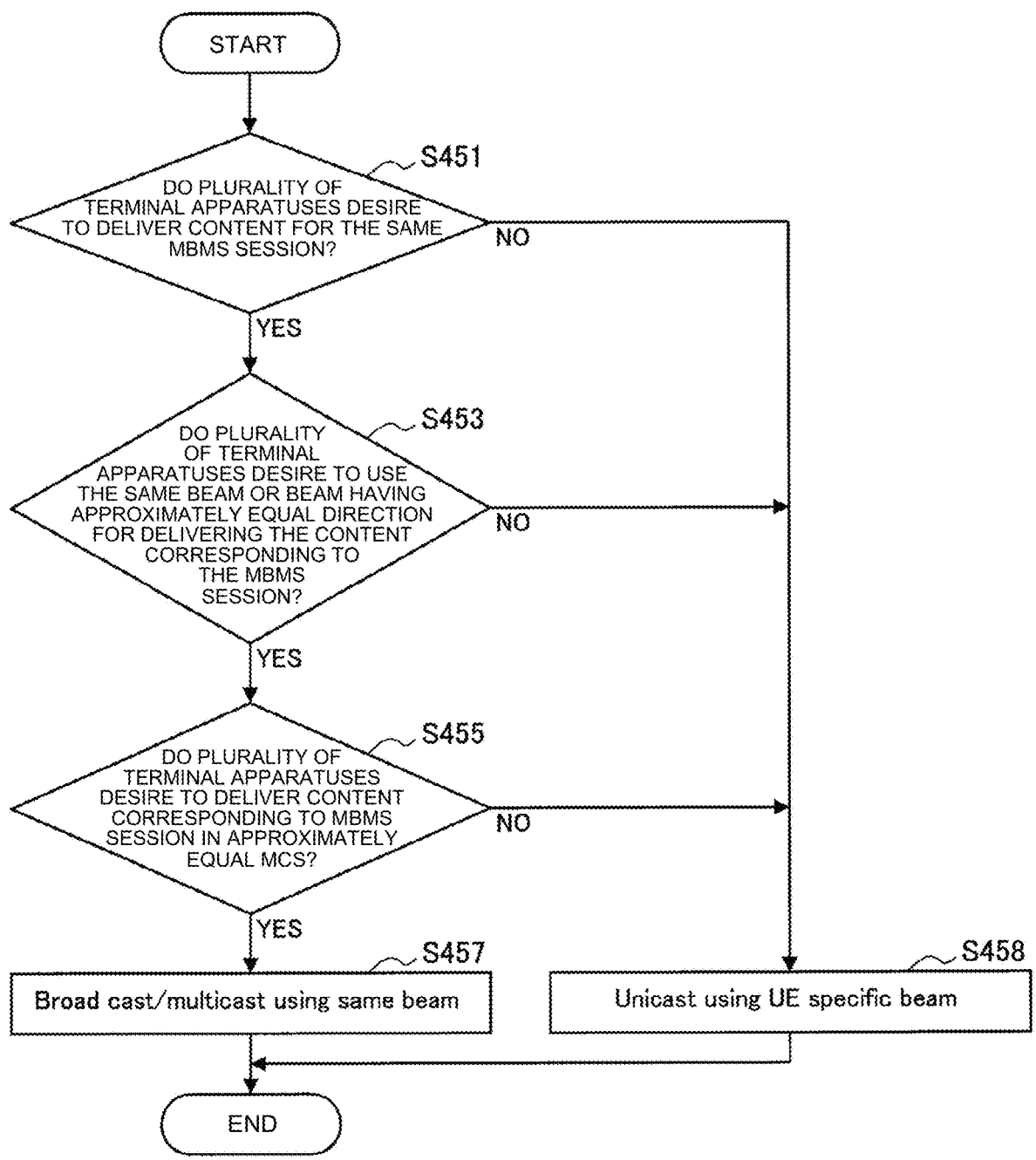
FIG. 18 is a flowchart illustrating an example of a processing procedure in a base station 100 in the communication system according to the second modification.

Subsequently, an example of the procedure of a series of processing steps for determining whether or not the base station 100 merges beams among the plurality of terminal apparatuses 200 in the example illustrated in FIG. 17 is described with reference to FIG. 18. FIG. 18 is a flowchart illustrating an example of the procedure of processing of the base station 100 in the communication system according to the present modification and illustrates an example of the procedure of processing for determining whether or not the base station 100 merges beams among a plurality of terminal apparatuses 200.

As illustrated in FIG. 18, the base station 100 determines whether or not a plurality of terminal apparatuses 200 desire to deliver content (i.e., MBMS content) for the same MBMS session (S451). In addition, the base station 100 determines whether or not the plurality of terminal apparatuses 200 desire to use the same beam or a beam having approximately equal direction, as the beam used for delivering the content corresponding to the MBMS session (S453). In addition, the base station 100 determines whether or not the plurality of terminal apparatuses 200 desire to deliver the content corresponding to the MBMS session in the approximately equal MCS (S455). In a case where the plurality of terminal apparatuses 200 use, for the content corresponding to the same MBMS session (YES in S451), the same beam or beams having approximately equal direction (YES in S453) and desire the delivery with approximately equal MCS (YES in S455), the base station 100 delivers (broadcast or multicast) the content to the plurality of terminal apparatuses 200 using a common beam (S457).

On the other hand, if each of the plurality of terminal apparatuses 200 desires to deliver the content corresponding to different MBMS sessions from each other (NO in S451), the base station 100 delivers individually to each of the plurality of terminal apparatuses 200 using the UE-specific beam (S458). The same applies to a case where the plurality of terminal apparatuses 200 desire to use different beams as beams used for delivering content corresponding to the MBMS session (NO in S453), or a case where the plurality of terminal apparatuses 200 desire to deliver content corresponding to the MBMS session in different MCSs (NO in S455).

A supplementary description is now given of the difference between the case where the MBMS service is provided to a plurality of terminal apparatuses using a common beam (directional beam) as described above and the case where the MBMS service is provided to a plurality of terminal apparatuses using a cell-specific beam. In the case of using the cell-specific beam, the beam does not include control information for each terminal apparatus 200. On the other hand, in the case where the MBMS service is provided to a plurality of terminal apparatuses using a common beam (UE-specific beam), the beam includes control information for each terminal apparatus 200 individually. In other words, in this case, the settings of the beam are also performed for each terminal apparatus 200. Moreover, even in the case where the control information is included for each terminal apparatus 200, common information is used for a data portion (e.g., a portion corresponding to MBMS content data), so it is desirable that the modulation scheme or the like are set to be common among the plurality of terminal apparatuses 200.

As described above, in the present modification, the base station merges the resources of the beam used for delivering the MBMS content with respect to at least some of two or more of the plurality of terminal apparatuses depending on the conditions. Such control makes it also possible to switch selectively the delivery schemes of delivering the program content (e.g., the MBMS content) to each terminal apparatus depending on the conditions at each time by using the communication system according to the present modification. Thus, the communication system according to the present modification enables the efficiency of resource utilization in the entire system to be improved, resulting in expecting an effect of improving the throughput in the entire system.

Third Modification

Subsequently, a modification of the communication system according to another embodiment of the present disclosure is described. Moreover, the present modification is also referred to as a "third modification".

As described above, the MBMS content is transmitted by multicast from the content server to the base station in the CN and is transmitted by multicast using the UE-specific beam from the base station to the terminal apparatus in the RAN. In the case where the MBMS session is provided from a base station to each terminal apparatus using the UE-specific beam (i.e., the case of delivering the MBMS content), the UE-specific beam corresponding to each terminal apparatus is transmitted at a different time in some cases. This is because, in order to provide the MBMS session to each of a plurality of terminal apparatuses using the same time resource, in one example, each of the plurality of terminal apparatuses is necessary to be arranged at a spatially separable position. In other words, in a case where a plurality of terminal apparatuses are located in an area where spatial separation is difficult (e.g., a case where a plurality of terminal apparatuses are located in the same area), the UE-specific beam corresponding to each of the plurality of terminal apparatuses uses different time/frequency resources from each other. Due to such characteristics, it can be difficult, in some cases, to deliver the same information to each of a plurality of terminal apparatuses at the same timing.

Further, it is demanded to introduce a mechanism that allows a user holding a terminal apparatus to specify a time for viewing broadcast content through the terminal apparatus. In such a case, in one example, in the case where the terminal apparatus receives the provision of the MBMS session, there is a possibility to be necessary to introduce a mechanism capable of specifying the time at which the provision is performed. In other words, in order to deliver the MBMS content to each of a plurality of terminal apparatuses at different timings by multicast using the UE-specific beam, a different response from the ordinary multicast that is capable of delivering the content to a plurality of terminal apparatuses at the same time is necessitated.

Figure 19:
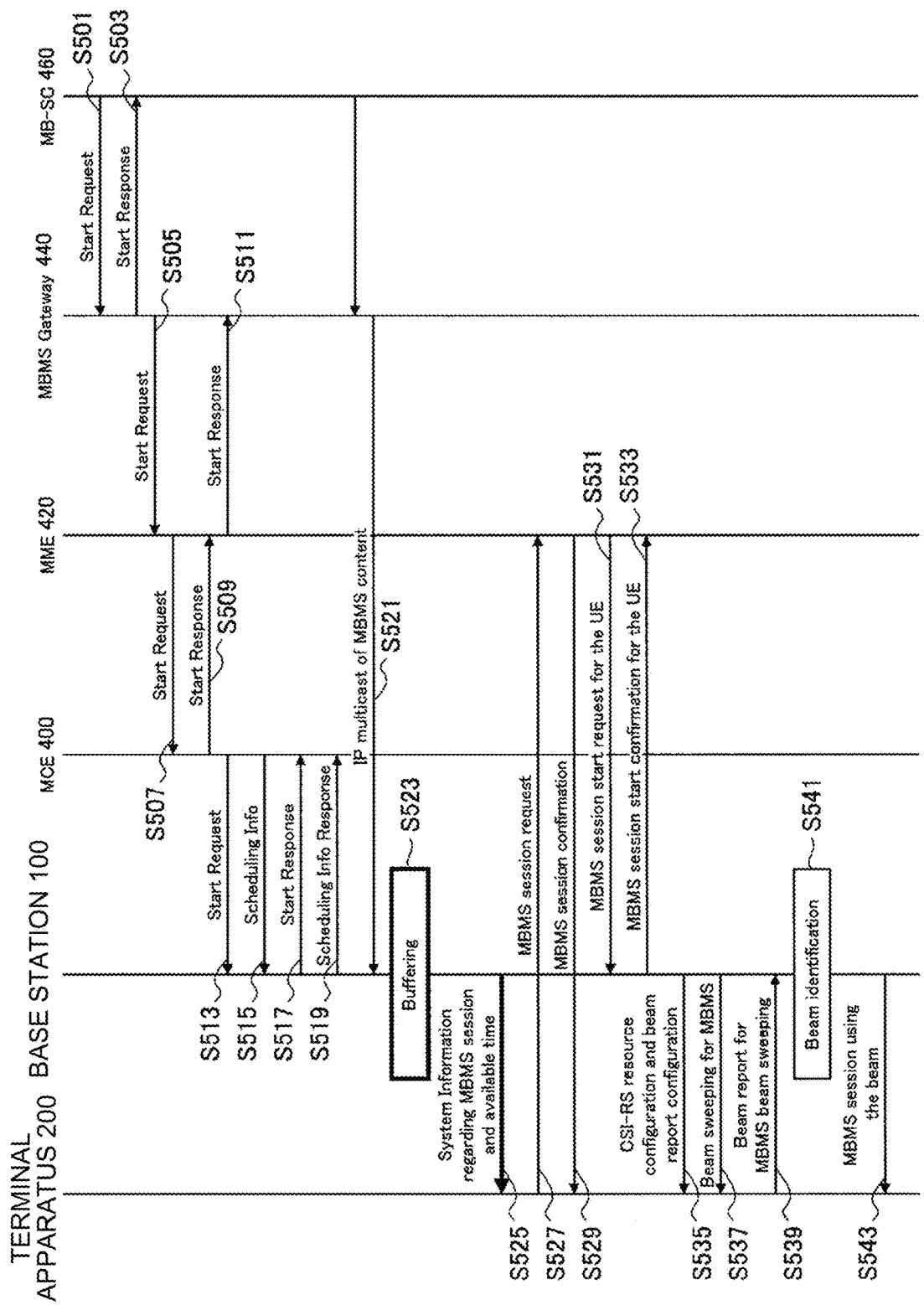
FIG. 19 is a schematic sequence diagram illustrating an example of a procedure for providing a program to each terminal apparatus using a directional beam in a communication system according to a third modification.

In view of such a situation, in the communication system according to the present modification, a buffer provided in the base station absorbs a difference (i.e., a time lag) in the delivery timing of the MBMS content between a plurality of terminal apparatuses, and the information regarding the allowable time difference is notified to each of the plurality of terminal apparatuses. Moreover, the notification can be performed only by using, in one example, system information or dedicated signaling. Thus, an example of the procedure of a series of processing steps of the communication system according to the present modification is now described with reference to FIG. 19, by particularly focusing on a mechanism for absorbing the time difference. FIG. 19 is a schematic sequence diagram illustrating an example of a procedure for providing a program to each terminal apparatus using a directional beam in the communication system according to the present modification. Moreover, the steps denoted by reference numerals S501 to S519 correspond to the steps denoted by reference numerals S201 to S219 in FIG. 13, respectively. Thus, a detailed description of the steps denoted by reference numerals S501 to S519 is omitted.

As illustrated in FIG. 19, in a case where the MBMS content is transferred (IP multicast) from the MB-SC 460 to the MBMS gateway 440, the MBMS content is IP multicast from the MBMS gateway 440 to the base station 100 (S521).

The base station 100 (the communication control unit 151) holds (buffers) the data of the MBMS content subjected to the IP multicast from the MBMS gateway 440 in a predetermined storage area (S523). In this case, the base station 100 calculates a period during which the acquired data of MBMS content can be held (buffered) on the basis of, in one example, the communication speed for providing the MBMS session (i.e., delivering the MBMS content) and the capacity (buffer amount) of the storage area available to itself. Then, the base station 100 (the notification unit 155) notifies the terminal apparatus 200, by using broadcast or dedicated signaling as system information, of the information regarding the calculated period, that is, the information regarding the period in which the MBMS content can be buffered (S525).

The terminal apparatus 200 receives the notification of the information regarding the period in which the MBMS content can be buffered from the base station 100 and performs a procedure for setting the UE-specific beam for receiving the MBMS content by specifying a destination (e.g., unicast or multicast) for itself within the period (S527 to S539). In addition, the base station 100 identifies a beam to be used for delivering the MBMS content to the terminal apparatus 200 (S541), in response to the report from the terminal apparatus 200 in the procedure (S539). Then, the base station 100 (the communication control unit 241) delivers (e.g., Multicast) the MBMS content held in the predetermined storage area to the terminal apparatus 200 using the UE-specific beam (i.e., the identified beam) (S543). Moreover, the above processing steps denoted by reference numerals S527 to S543 are substantially similar to the steps denoted by reference numerals S227 to S243 in FIG. 13, respectively.

Further, the base station 100 is capable of adjusting the timing to start holding (buffering) the data of the MBMS content depending on the information regarding the timing at which the MBMS content notified from the terminal apparatus 200 is desired to be delivered. Moreover, the information regarding the timing at which the terminal apparatus 200 desires to deliver the MBMS content can be notified from the terminal apparatus 200 to the base station 100 before the timing. In addition, the terminal apparatus 200 can notify the base station 100 that the MBMS content is currently desired to be delivered.

Figure 20:
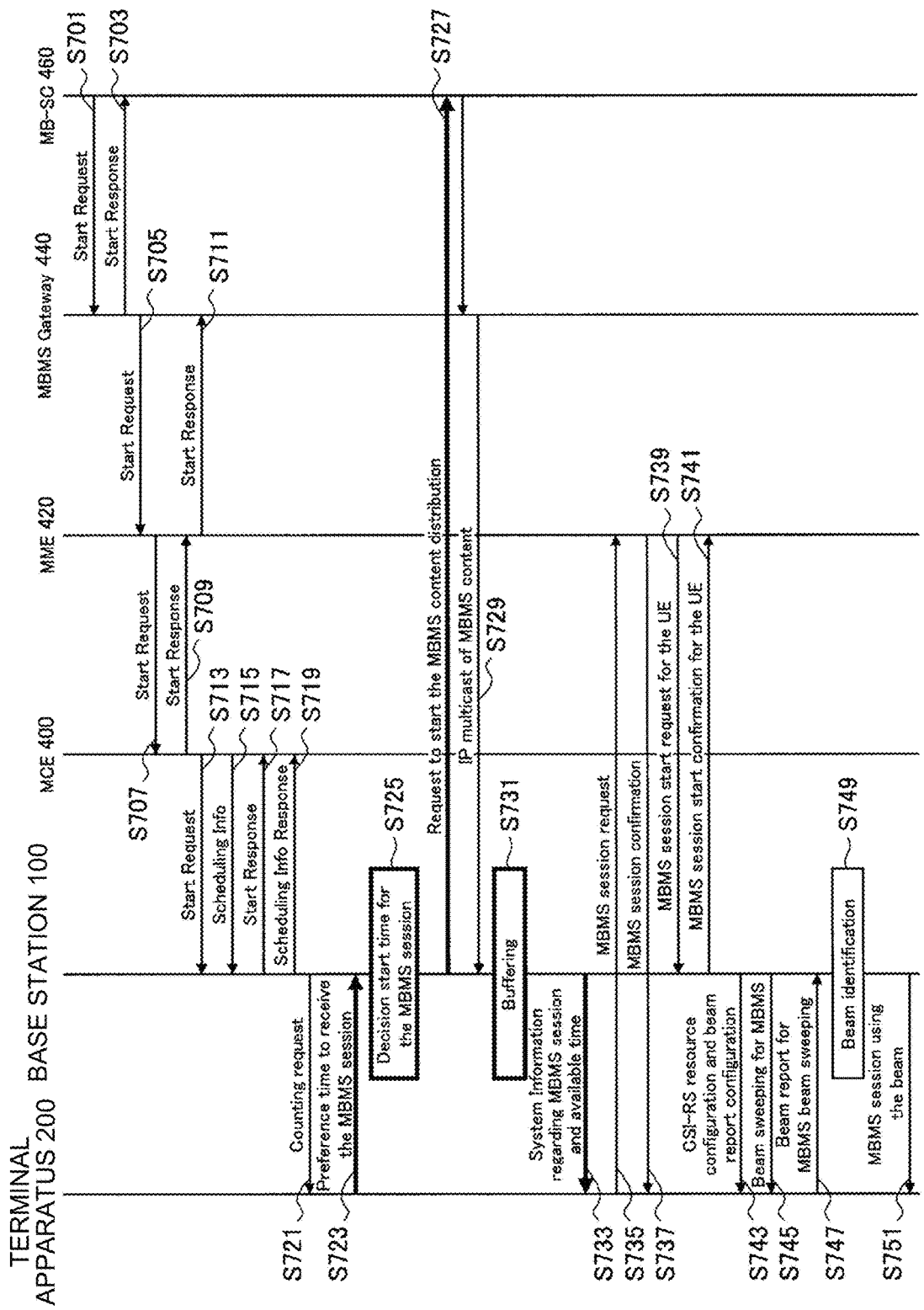
FIG. 20 is a schematic sequence diagram illustrating another example of a procedure for providing a program to each terminal apparatus using a directional beam in a communication system according to the third modification.

Moreover, the association of the information regarding the timing at which the terminal apparatus 200 desires to deliver the MBMS content with the information notified from the terminal apparatus 200 to the base station 100 for counting makes it possible for the base station 100 to recognize the timing. In other words, the base station 100 can adjust the timing to start holding (buffering) the data of the MBMS content depending on the timing recognized on the basis of the information notified from the terminal apparatus 200. In one example, FIG. 20 is a schematic sequence diagram illustrating another example of a procedure for providing a program to each terminal apparatus using a directional beam in the communication system according to the present modification. In other words, FIG. 20 illustrates an example of a procedure for adjusting the timing at which the base station 100 starts holding (buffering) the data of the MBMS content. Moreover, the steps denoted by reference numerals S701 to 5719 are similar to the steps denoted by reference numerals S501 to S519 in FIG. 19, respectively, and so a detailed description thereof will be omitted.

As illustrated in FIG. 20, the base station 100 (the notification unit 155) notifies the terminal apparatus 200 of a counting request to perform the counting (S721). The terminal apparatus 200 (the notification unit 247), when receiving the counting request from the base station 100, replies information to the base station 100 regarding the desired timing of the providing for the MBMS session desired to be provided (i.e., the MBMS content desired to be delivered) (S723).

The base station 100 (the communication control unit 151) decides the timing to start providing the corresponding MBMS session on the basis of the information notified from the terminal apparatus 200 (S725). Then, the base station 100 (the notification unit 155) notifies the MB-SC 460 of a request for starting delivering the content (i.e., MBMS content) corresponding to the MBMS session depending on the decided timing (S727). The MB-SC 460, when receiving the notification, transfers (IP multicast) the corresponding MBMS content to the MBMS gateway 440. In addition, the MBMS gateway 440 performs IP multicast of the MBMS content transferred from the MB-SC 460 to the base station 100 (S727). The base station 100 (the communication control unit 151) holds (buffers) the data of the MBMS content subjected to the IP multicast from the MBMS gateway 440 in a predetermined storage area (S731).

Moreover, the subsequent steps, that is, the steps denoted by reference numerals S733 to S751 are similar to the steps denoted by reference numerals S525 to S543 in FIG. 19, respectively, and so a detailed description thereof will be omitted.

The control as described above makes it possible for the base station 100 to control the timing at which the terminal apparatus 200 starts holding (buffering) data of content corresponding to the MBMS service depending on the timing at which the terminal apparatus 200 desires to provide the MBMS service.

A description of the relationship between the technology according to the present modification and a technology called mobile edge computing (MEC) is now given. The MEC is a technology that allows a base station to hold data of an application executed on the side of a server, thereby reducing the latency between the application and a terminal apparatus. In view of such characteristics, in the communication system according to the present modification, the technology causing the base station to hold the data of the MBMS content and delivering the MBMS content from the base station to the terminal apparatus on the basis of the data can be regarded as a type of the MEC.

Moreover, the communication system according to the present modification is a service assuming provision of broadcast content, and it differs from a typical MEC in that the period in which data to be delivered (i.e., MBMS content) is held at the side of a base station is finite. In addition, in the communication system according to the present modification, there is a high possibility that strictly speaking a request for improvement in latency or response is not provided, as compared to the typical MEC. In other words, in the communication system according to the present modification, in providing a service as broadcasting, in order to absorb the reception timing between the terminal apparatuses, the characteristic point is that the content data is held (buffered) by the base station.

4. APPLICATION EXAMPLES

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macrocell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or semi-permanently. Further, at least one of constituent elements of the base station 100 may be realized in the base station device or a module for the base station device.

Further, for example, the terminal apparatus 200 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Further, the terminal apparatus 200 may be realized as a terminal that performs machine to machine (M2M) communication (also referred to as a machine type communication (MTC) terminal). Further, the terminal apparatus 200 may be realized as a so-called "low cost terminal", such as an MTC terminal, an eMTC terminal, or an NB-IoT terminal. Moreover, at least a part of the constituent elements of the terminal apparatus 200 may be realized in a module mounted on the terminal (for example, an integrated circuit module configured on one die).

4.1. Application Examples for Base Station Device

First Application Example

Figure 21:
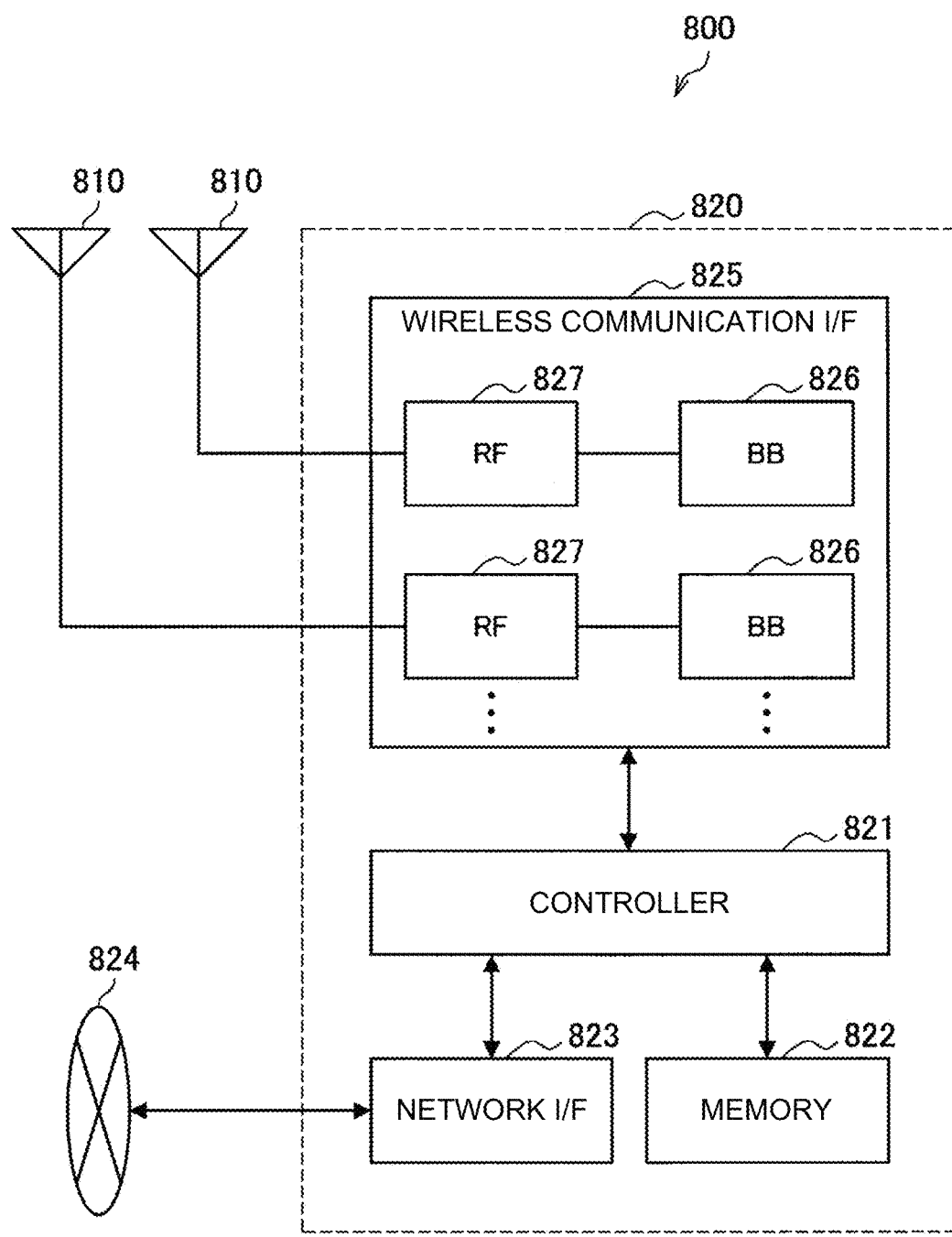
FIG. 21 is a block diagram illustrating a first example of a schematic configuration of an eNB.

FIG. 21 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 21, and the plurality of antennas 810 may, for example, correspond to a plurality of frequency bands used by the eNB 800. It should be noted that while FIG. 21 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 21, and the plurality of BB processors 826 may, for example, correspond to a plurality of frequency bands used by the eNB 800. Further, the wireless communication interface 825 may also include a plurality of the RF circuits 827, as illustrated in FIG. 21, and the plurality of RF circuits 827 may, for example, correspond to a plurality of antenna elements. Note that FIG. 21 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 21, one or more constituent elements (for example, at least one of the communication control unit 151, the information acquisition unit 153, or the notification unit 155) included in the processing unit 150 described with reference to FIG. 2 may be implemented in the wireless communication interface 825. Alternatively, at least some of the constituent elements may be implemented in the controller 821. As one example, a module including a part (for example, the BB processor 826) of or the whole of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 21, the wireless communication unit 120 described with reference to FIG. 2 may be implemented in the wireless communication interface 825 (for example, the RF circuit 827). Further, the antenna unit 110 may be implemented in the antenna 810. In addition, the network communication unit 130 may be implemented in the controller 821 and/or the network interface 823. Further, the storage unit 140 may be implemented in the memory 822.

Second Application Example

Figure 22:
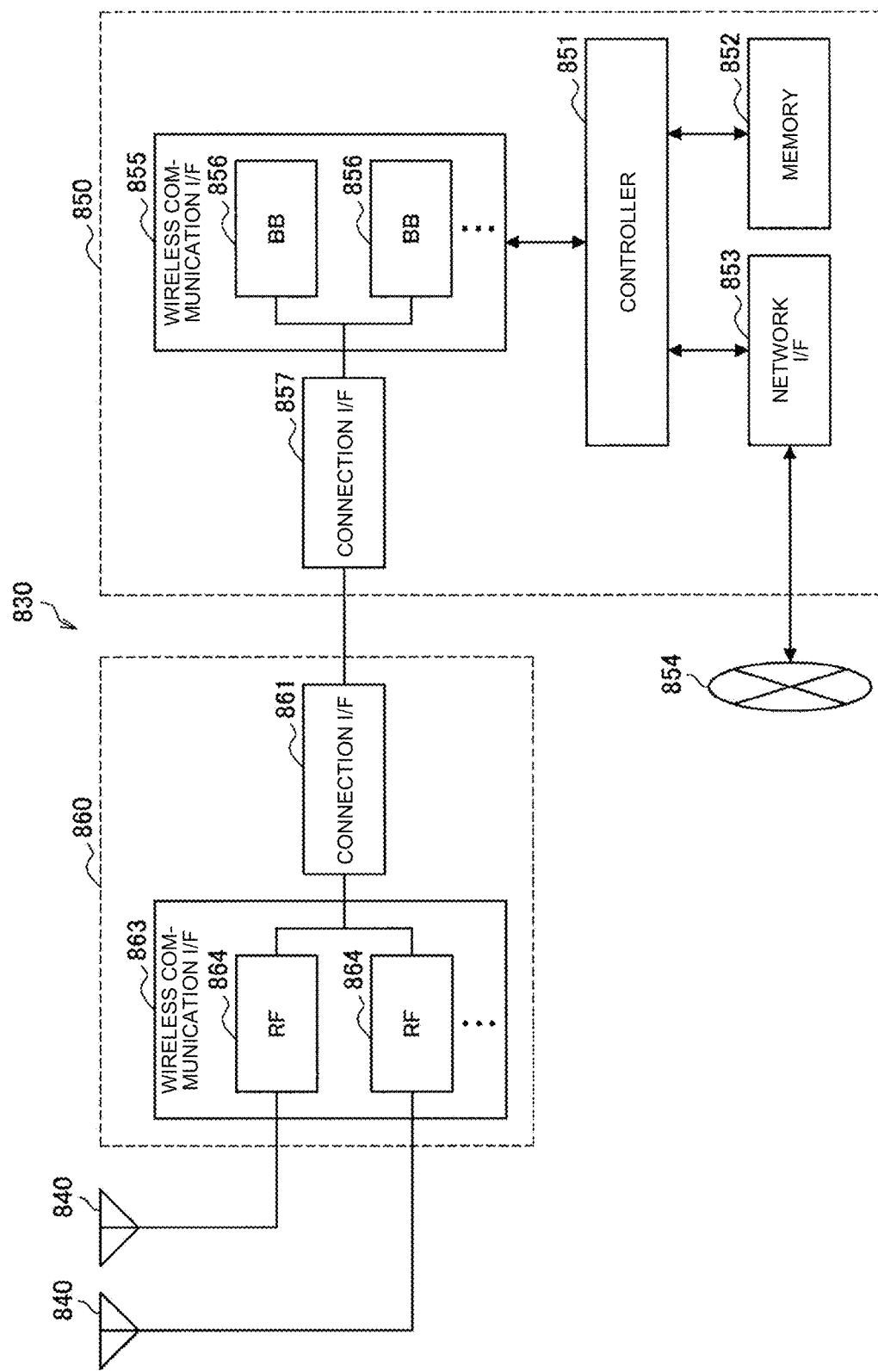
FIG. 22 is a block diagram illustrating a second example of the schematic configuration of the eNB.

FIG. 22 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 22, and the plurality of antennas 840 may, for example, correspond to a plurality of frequency bands used by the eNB 830. Note that FIG. 22 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 21.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 21 except that the BB processor 856 is connected to an RF circuit 864 of the RRH 860 via the connection interface 857. The wireless communication interface 855 may include a plurality of the BB processors 856, as illustrated in FIG. 21, and the plurality of BB processors 856 may, for example, correspond to a plurality of frequency bands used by the eNB 830. Note that FIG. 22 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 22, and the plurality of RF circuits 864 may, for example, correspond to a plurality of antenna elements. Note that FIG. 22 illustrates an example in which the wireless communication interface 863 includes the plurality of RF circuits 864, but the wireless communication interface 863 may include the single RF circuit 864.

In the eNB 830 illustrated in FIG. 22, one or more constituent elements (at least one of the communication control unit 151, the information acquisition unit 153, or the notification unit 155) included in the processing unit 150 described with reference to FIG. 2 may be implemented in the wireless communication interface 855 and/or the wireless communication interface 863. Alternatively, at least some of the constituent elements may be implemented in the controller 851. As one example, a module including a part (for example, the BB processor 856) of or the whole of the wireless communication interface 855 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 22, for example, the wireless communication unit 120 described with reference to FIG. 2 may be implemented in the wireless communication interface 863 (for example, the RF circuit 864). Further, the antenna unit 110 may be implemented in the antenna 840. In addition, the network communication unit 130 may be implemented in the controller 851 and/or the network interface 853. Further, the storage unit 140 may be implemented in the memory 852.

4.2. Application Examples for Terminal Apparatus

First Application Example

Figure 23:
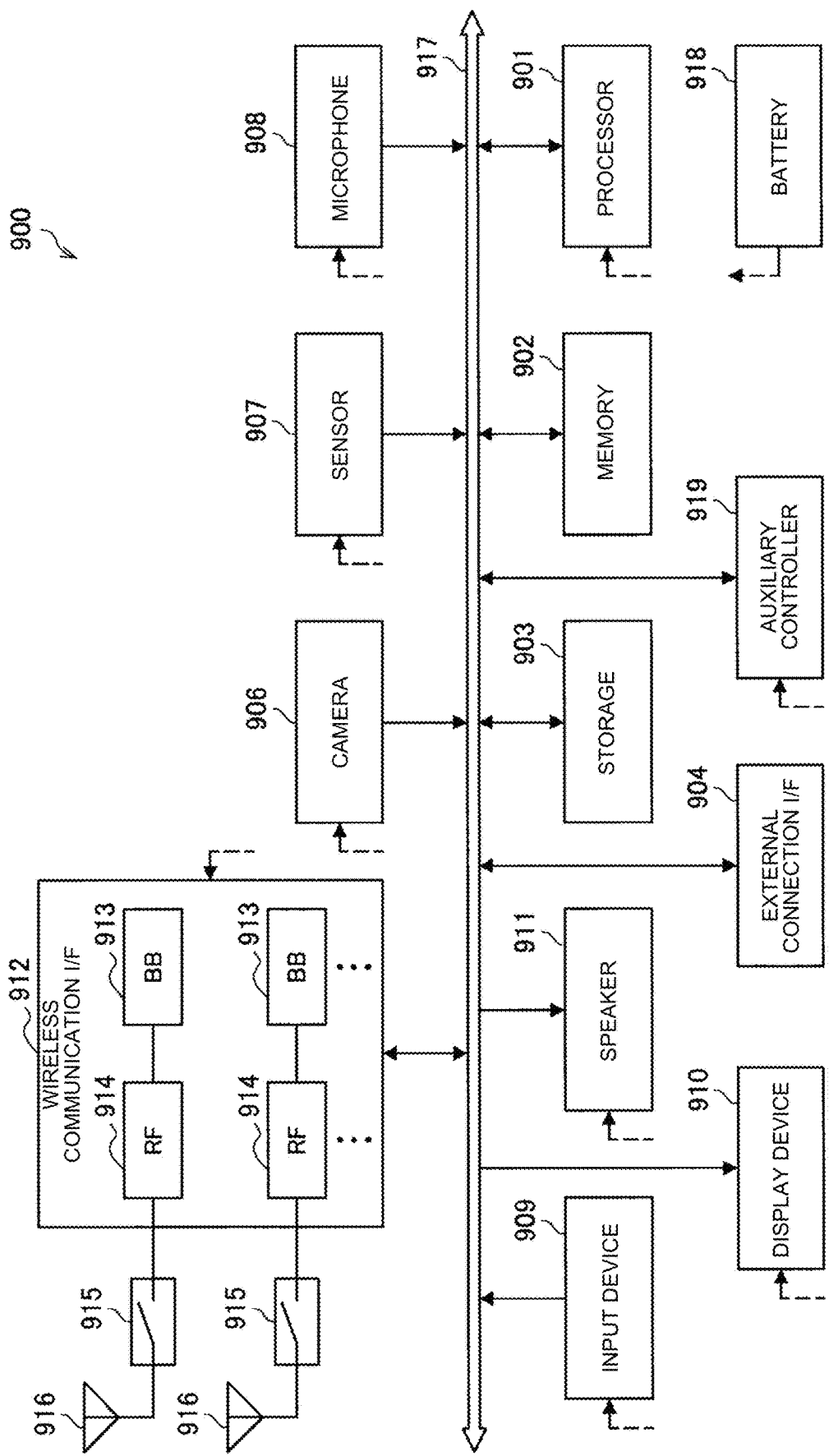
FIG. 23 is a block diagram illustrating an example of a schematic configuration of a smartphone.

FIG. 23 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 23. Note that FIG. 23 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 23. Note that FIG. 23 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 23 via a feeder line that is partially illustrated in the figure as a dashed line. The auxiliary controller 919, for example, operates a minimally necessary function of the smartphone 900 in a sleep mode.

In the smartphone 900 illustrated in FIG. 23, one or more constituent elements included in the processing unit 240 (at least one of the communication control unit 241, the information acquisition unit 243, the measuring unit 245, or the notification unit 247) described with reference to FIG. 3 may be implemented in the wireless communication interface 912. Alternatively, at least some of the constituent elements may be implemented in the processor 901 or the auxiliary controller 919. As one example, a module including a part (for example, the BB processor 913) of or the whole of the wireless communication interface 912, the processor 901, and/or the auxiliary controller 919 may be implemented on the smartphone 900. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 23, for example, the wireless communication unit 220 described with reference to FIG. 3 may be implemented in the wireless communication interface 912 (for example, the RF circuit 914). Further, the antenna unit 210 may be implemented in the antenna 916. Further, the storage unit 230 may be implemented in the memory 902.

Second Application Example

FIG. 24 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 24. Note that FIG. 24 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 24. Note that FIG. 24 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 24 via a feeder line that is partially illustrated in the figure as a dashed line. Further, the battery 938 accumulates the electric power supplied from the vehicle.

In the car navigation apparatus 920 illustrated in FIG. 24, one or more constituent elements included in the processing unit 240 (at least one of the communication control unit 241, the information acquisition unit 243, the measuring unit 245, or the notification unit 247) described with reference to FIG. 3 may be implemented in the wireless communication interface 933. Alternatively, at least some of the constituent elements may be implemented in the processor 921. As one example, a module including a part of (for example, the BB processor 934) of or the whole of the wireless communication interface 933 and/or the processor 921 may be implemented on the car navigation apparatus 920. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the car navigation apparatus 920, and the wireless communication interface 933 (for example, the BB processor 934) and/or the processor 921 may execute the program. In this way, the car navigation apparatus 920 or the module may be provided as a device including the one or more constituent elements and a program causing the processor to function as the one or more constituent elements may be provided. In addition, a readable recording medium on which the program is recorded may be provided.

Further, in the car navigation apparatus 920 illustrated in FIG. 24, for example, the wireless communication unit 220 described with reference to FIG. 3 may be implemented in the wireless communication interface 933 (for example, the RF circuit 935). Further, the antenna unit 210 may be implemented in the antenna 937. Further, the storage unit 230 may be implemented in the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or the vehicle) 940 may be provided as a device including at least one of the communication control unit 241, the information acquisition unit 243, the measuring unit 245, or the notification unit 247. The vehicle module 942 generates vehicle data such as vehicle speed, engine speed, and trouble information, and outputs the generated data to the in-vehicle network 941.

5. CONCLUDING REMARKS

As described above, in the communication system according to an embodiment of the present disclosure, the base station delivers the MBMS content that is multicast from the upper node (e.g., the MBMS gateway) to the terminal apparatus using at least a part of the directional beams (i.e., UE-specific beam) allocated to the terminal apparatus from the plurality of directional beams. The configuration as described above makes it possible to deliver efficiently so-called broadcast content (e.g., MBMS content) to each terminal apparatus even under such a situation that the wireless communication between the base station and each terminal apparatus is spatially separated by using the directional beam. As described above, according to the communication system according to an embodiment of the present disclosure, it is possible to implement the delivery of content to a terminal apparatus using a directional beam more suitably.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

A communication apparatus comprising:
a communication unit configured to perform wireless communication; and
a control unit configured to control in such a way as to deliver content subjected to multicast from an upper node to a terminal apparatus using at least a part of a plurality of directional beams allocated to the terminal apparatus from the directional beams used for the wireless communication.

(2)

The communication apparatus according to (1), wherein the control unit controls in such a way as to deliver the content to the terminal apparatus by specifying as a destination the terminal apparatus to which the at least part of the directional beams is allocated.

(3)

The communication apparatus according to (2), further comprising:
an acquisition unit configured to acquire a request for delivering the content for each program,
wherein the control unit controls, depending on a condition of the request for each of the programs, a delivery scheme of the content corresponding to the program.

(4)

The communication apparatus according to (3), wherein the control unit selects any one of broadcast, multicast, and unicast as the delivery scheme of the content depending on the number of terminal apparatuses desiring to deliver the content for each of the programs.

(5)

The communication apparatus according to (3), wherein the control unit controls, depending on settings of wireless communication with each of a plurality of the terminal apparatuses, in such a way as to deliver the content used in common by specifying each of the plurality of terminal apparatuses as a destination through the directional beam used in common.

(6)

The communication apparatus according to (5),
wherein the acquisition unit acquires information regarding settings of wireless communication with the terminal apparatus from each of one or more of the terminal apparatuses, and
the control unit controls in such a way as to deliver the content used in common by specifying each of a plurality of the terminal apparatuses as a destination through the directional beam used in common depending on the acquired information.

(7)

The communication apparatus according to any one of (3) to (6), further comprising: a notification unit configured to notify the terminal apparatus of information regarding a period in which the content is held.

(8)

The communication apparatus according to (7),
wherein the acquisition unit acquires information regarding a timing at which the terminal apparatus desires to deliver the content from a predetermined node managing a session, and
the notification unit transmits a request for delivering the content to the upper node depending on the timing.

(9)

The communication apparatus according to any one of (1) to (8),
wherein the control unit
sets, separately from first wireless communication used for notification of information from the terminal apparatus, second wireless communication used for delivering the content, and
restricts the first wireless communication and maintains the second wireless communication depending on a request for maintaining the second wireless communication during a first mode restricting the first wireless communication, the request being associated with a request, which is notified from the terminal apparatus and is for making a transition to the first mode.

(10)

A communication apparatus comprising:
a communication unit configured to perform wireless communication; and
a control unit configured to control in such a way to receive content subjected to multicast from an upper node to a base station and delivered from the base station using at least a part of directional beams allocated from a plurality of directional beams.

The communication apparatus according to (10), further comprising:
a notification unit configured to notify a predetermined node managing a session of a request for delivering the content,
wherein the control unit, after notification of the request, controls in such a way to receive the content to be delivered using the allocated at least part of the directional beams.

(12)

The communication apparatus according to (11),
wherein second wireless communication used for delivering the content is set separately from first wireless communication used for notification of information to the base station, and
the notification unit notifies a predetermined device configured to manage a transition between a first mode and a second mode of a request for making a transition to the first mode restricting the first wireless communication in association with a request for maintaining the second wireless communication during the first mode.

(13)

The communication apparatus according to (12),
wherein the second wireless communication uses the allocated at least part of the directional beams,
the control unit controls in such a way to make a transition from the first mode to the second mode capable of performing the first wireless communication depending on a condition relating to the at least part of the directional beams in the first mode, and
the notification unit, after the transition to the second mode, notifies the base station of a request for settings of communication using the at least part of the directional beams.

(14)

The communication apparatus according to any one of (11) to (13), wherein the notification unit notifies the base station of information regarding a timing at which the content is desired to be delivered.

(15)

A communication method executed by a computer, the method comprising:
performing wireless communication; and
controlling in such a way as to deliver content subjected to multicast from an upper node to a terminal apparatus using at least a part of a plurality of directional beams allocated to the terminal apparatus from the directional beams used for the wireless communication.

(16)

A communication method executed by a computer, the method comprising:
performing wireless communication; and
controlling in such a way to receive content subjected to multicast from an upper node to a base station and delivered from the base station using at least a part of directional beams allocated from a plurality of directional beams.

(17)

A program causing a computer to execute:
performing wireless communication; and
controlling in such a way as to deliver content subjected to multicast from an upper node to a terminal apparatus using at least a part of a plurality of directional beams allocated to the terminal apparatus from the directional beams used for the wireless communication.

(18)

A program causing a computer to execute:
performing wireless communication; and
controlling in such a way to receive content subjected to multicast from an upper node to a base station and delivered from the base station using at least a part of directional beams allocated from a plurality of directional beams.

REFERENCE SIGNS LIST

1 SYSTEM
10 CELL
40 CORE NETWORK
50 PACKET DATA NETWORK
60 APPLICATION SERVER
100 BASE STATION
110 ANTENNA UNIT
120 WIRELESS COMMUNICATION UNIT
130 NETWORK COMMUNICATION UNIT
140 STORAGE UNIT
150 PROCESSING UNIT
151 COMMUNICATION CONTROL UNIT
153 INFORMATION ACQUISITION UNIT
155 NOTIFICATION UNIT
200 TERMINAL APPARATUS
210 ANTENNA UNIT
220 WIRELESS COMMUNICATION UNIT
230 STORAGE UNIT
240 PROCESSING UNIT
241 COMMUNICATION CONTROL UNIT
243 INFORMATION ACQUISITION UNIT
245 MEASURING UNIT
247 NOTIFICATION UNIT
300 MEC SERVER

The invention claimed is:

1. A communication apparatus configured as a base station for delivering multimedia broadcast and multicast service (MBMS) content and comprising:
a transceiver configured to perform wireless communication; and
control circuitry configured to control in such a way as to deliver content subjected to multicast from an upper node to a terminal apparatus according to a predetermined delivery method, the predetermined delivery method comprising:
receiving MBMS content;
receiving an MBMS session request for the terminal apparatus;
transmitting a MBMS session start confirmation;
transmitting CSI-RS resource configuration information and beam report configuration information to the terminal;
perform MBMS beam sweeping;
receiving a beam report for the MBMS beam sweeping from the terminal;
identifying a beam from the MBMS beam sweeping as a beam for delivering the MBMS content to the terminal; and
providing a MBMS service to the terminal via the identified beam, the MBMS service including transmitting the received MBMS content to the terminal.

2. The communication apparatus according to claim 1, wherein the predetermined delivery method further comprises:
receiving an inactive mode request from the terminal;
transmitting an inactive mode request confirmation to the terminal;
Pausing the MBMS service and starting a timer; and
one of:
stopping the MBMS service based on not receiving a reactivation request from the terminal before the timer expires, or
resuming the MBMS service based on receiving the reactivation request from the terminal before the timer expires.

3. The communication apparatus according to claim 2, wherein the reactivation request includes a request for beam reassignment based on a beam power measurement by the terminal, and
wherein the resuming the MBMS service includes resuming the MBMS service via a beam assigned based on the request for beam reassignment.

4. The communication apparatus according to claim 1, wherein the predetermined delivery method further comprises:
receiving a second beam report for the MBMS beam sweeping from a second terminal;
identifying a second beam from the MBMS beam sweeping as a second beam for delivering the MBMS content to the second terminal;
determining an optimal beam based on the first and second beam reports;
notifying the optimal beam to the terminal and the second terminal; and
providing the MBMS service to the terminal and the second terminal via the identified optimal beam.

5. The communication apparatus according to claim 1 wherein the predetermined delivery method further comprises:
buffering the received MBMS content,
wherein the transmitting the CSI-RS resource configuration information and the beam report configuration information to the terminal includes transmitting information regarding a period in which the MBMS content can be buffered; and
receiving a report from the terminal regarding a timing at which the terminal wishes to receive the MBMS content, the timing determined by the terminal based on the period in which the MBMS content can be buffered, wherein the providing the MBMS service includes providing the MBMS service in accordance with the timing at which the terminal wishes to receive the MBMS content.

6. A method executed by a communication apparatus configured as a base station for delivering multimedia broadcast and multicast service (MBMS) content to perform a method comprising:

performing wireless communication; and controlling in such a way as to deliver content subjected to multicast from an upper node to a terminal apparatus to deliver content subjected to multicast from an upper node to a terminal apparatus according to a predetermined delivery method, the predetermined delivery method comprising:

receiving MBMS content;

receiving an MBMS session request for the terminal apparatus;

transmitting a MBMS session start confirmation;

transmitting CSI-RS resource configuration information and beam report configuration information to the terminal;

perform MBMS beam sweeping;

receiving a beam report for the MBMS beam sweeping from the terminal;

identifying a beam from the MBMS beam sweeping as a beam for delivering the MBMS content to the terminal; and providing a MBMS service to the terminal via the identified beam, the MBMS service including transmitting the received MBMS content to the terminal.

7. A non-transitory computer readable program product containing a program causing a communication apparatus configured as a base station, for delivering multimedia broadcast and multicast service (MBMS) content, to perform a method comprising:

to deliver content subjected to multicast from an upper node to a terminal apparatus according to a predetermined delivery method, the predetermined delivery method comprising:

receiving MBMS content;

receiving an MBMS session request for the terminal apparatus;

transmitting a MBMS session start confirmation;

transmitting CSI-RS resource configuration information and beam report configuration information to the terminal;

perform MBMS beam sweeping;

receiving a beam report for the MBMS beam sweeping from the terminal;

identifying a beam from the MBMS beam sweeping as a beam for delivering the MBMS content to the terminal; and providing a MBMS service to the terminal via the identified beam, the MBMS service including transmitting the received MBMS content to the terminal.

* * * * *